United States Patent
Lee et al.

(10) Patent No.: US 12,159,473 B2
(45) Date of Patent: Dec. 3, 2024

(54) DEVICE FOR ANALYZING LARGE-AREA SAMPLE BASED ON IMAGE, DEVICE FOR ANALYZING SAMPLE BASED ON IMAGE BY USING DIFFERENCE IN MEDIUM CHARACTERISTIC, AND METHOD FOR MEASURING AND ANALYZING SAMPLE USING THE SAME

(71) Applicant: SOL INC., Seoul (KR)

(72) Inventors: Jong Muk Lee, Seoul (KR); Hee Chan Shin, Seoul (KR); Seong Won Kwon, Seoul (KR); Ki Ho Jang, Seoul (KR)

(73) Assignee: SOL INC., Seoul (KR)

( * ) Notice: Subject to any disclaimer, the term of this patent is extended or adjusted under 35 U.S.C. 154(b) by 0 days.

(21) Appl. No.: 18/176,893

(22) Filed: Mar. 1, 2023

(65) Prior Publication Data

US 2023/0215194 A1  Jul. 6, 2023

Related U.S. Application Data

(63) Continuation of application No. 17/106,084, filed on Nov. 28, 2020, now Pat. No. 11,624,899, which is a
(Continued)

(30) Foreign Application Priority Data

| May 31, 2018 | (KR) | .......................... 10-2018-0062489 |
| May 31, 2018 | (KR) | .......................... 10-2018-0062490 |
| Nov. 30, 2018 | (KR) | .......................... 10-2018-0152966 |

(51) Int. Cl.
*G06V 10/143* (2022.01)
*G01N 21/31* (2006.01)
(Continued)

(52) U.S. Cl.
CPC ............. *G06V 20/69* (2022.01); *G01N 21/31* (2013.01); *G02B 21/0032* (2013.01);
(Continued)

(58) Field of Classification Search
CPC ............. G02B 21/008; G02B 21/0032; G02B 21/0064; G01N 21/31; G01N 2021/1765; G06V 10/143; G06V 20/69
See application file for complete search history.

(56) References Cited

U.S. PATENT DOCUMENTS 7,599,064 B2 * 10/2009 Mos .................... G03F 7/70633
430/22
9,470,986 B2 * 10/2016 Fuchs ................. G03F 7/70633
(Continued)

FOREIGN PATENT DOCUMENTS

| JP | 63-302349 A | 12/1988 |
| JP | H02-22973 A | 1/1990 |

(Continued)

OTHER PUBLICATIONS

Office Action issued in KR 10-2018-0062490; mailed by the Korean Intellectual Property Office dated Nov. 6, 2019.
(Continued)

*Primary Examiner* — Howard D Brown, Jr.
(74) *Attorney, Agent, or Firm* — Studebaker & Brackett PC

(57) ABSTRACT

Provided are a device for analyzing a large-area sample based on an image, a device for analyzing a sample based on an image by using a difference in medium characteristic, and a method for measuring and analyzing a sample by using the same. The device for analyzing a large-area sample includes a first sensor array including sensors disposed while being spaced apart from each other in a first direction, a second sensor array including sensors disposed while being spaced
(Continued)

apart from each other in the first direction, and spaced apart from the first sensor array in a second direction, and a control unit that obtains image data for a cell included in the sample by using sensing data of the sensor on the sample, in which the sample is interposed between the first sensor array and the second sensor array.

6 Claims, 22 Drawing Sheets

Related U.S. Application Data continuation of application No. PCT/KR2019/006621, filed on May 31, 2019.

(51) Int. Cl.
  *G02B 21/00* (2006.01)
  *G06V 20/69* (2022.01)
  *G01N 21/17* (2006.01)

(52) U.S. Cl.
  CPC ....... *G02B 21/0064* (2013.01); *G02B 21/008* (2013.01); *G06V 10/143* (2022.01); *G01N 2021/1765* (2013.01)

(56) References Cited

U.S. PATENT DOCUMENTS

| | | | | |
|---|---|---|---|---|
| 10,113,971 | B2* | 10/2018 | Yeo | G01N 21/78 |
| 10,845,449 | B2* | 11/2020 | Connolly | G01R 33/032 |
| 2008/0143985 | A1* | 6/2008 | Mast | G03F 7/70616 |
| | | | | 355/53 |
| 2016/0061656 | A1* | 3/2016 | Awatsuji | G01J 1/0429 |
| | | | | 250/208.1 |
| 2016/0091705 | A1* | 3/2016 | Ben Ezra | G02B 21/361 |
| | | | | 348/79 |
| 2016/0161418 | A1* | 6/2016 | Yeo | G01N 21/78 |
| | | | | 422/82.09 |
| 2017/0262984 | A1* | 9/2017 | Barnes | G06V 20/698 |
| 2019/0137752 | A1* | 5/2019 | Shaffer | G02B 21/0012 |
| 2019/0310454 | A1* | 10/2019 | Shimada | G02B 21/088 |
| 2021/0131967 | A1* | 5/2021 | Studer | G01J 3/14 |
| 2021/0132351 | A1* | 5/2021 | Lee | G02B 21/0032 |
| 2022/0107264 | A1* | 4/2022 | Luo | G01N 21/93 |
| 2022/0155234 | A1* | 5/2022 | Kay | G01N 21/65 |

FOREIGN PATENT DOCUMENTS

| | | | | |
|---|---|---|---|---|
| JP | H11-64215 | A | 3/1999 | |
| JP | 5122737 | B2 | 1/2013 | |
| JP | 2013-542468 | A | 11/2013 | |
| JP | 2017-021020 | A | 1/2017 | |
| JP | 2018-033430 | A | 3/2018 | |
| JP | 2018-082355 | A | 5/2018 | |
| KR | 10-2008-0103437 | A | 11/2008 | |
| KR | 10-2013-0005244 | A | 1/2013 | |
| KR | 10-2016-0067607 | A | 6/2016 | |
| KR | 10-2017-0119448 | A | 10/2017 | |
| WO | WO-2015191978 | A1 * | 12/2015 | B01L 3/5027 |
| WO | 2017/173549 | A1 | 10/2017 | |

OTHER PUBLICATIONS

International Search Report issued in PCT/KR2019/006621, dated Aug. 28, 2019.
An Office Action; "Notice of Reasons for Refusal," mailed by the Japanese Patent Office dated Dec. 21, 2021, which corresponds to Japanese Patent Application No. 2021-517174 and is related to U.S. Appl. No. 17/106,084.

* cited by examiner

First area | Second area | Third area | Fourth area | Fifth area

DEVICE FOR ANALYZING LARGE-AREA SAMPLE BASED ON IMAGE, DEVICE FOR ANALYZING SAMPLE BASED ON IMAGE BY USING DIFFERENCE IN MEDIUM CHARACTERISTIC, AND METHOD FOR MEASURING AND ANALYZING SAMPLE USING THE SAME

CROSS-REFERENCE TO RELATED APPLICATIONS

The present application is a continuation of U.S. patent application Ser. No. 17/106,084, filed on Nov. 28, 2020, which is a Continuation of International Patent Application No. PCT/KR2019/006621, filed on May 31, 2019, which is based upon and claims the benefit of priority to Korean Patent Application Nos. 10-2018-0062489 filed on May 31, 2018, 10-2018-0062490 filed on May 31, 2018 and 10-2018-0152966 filed on Nov. 30, 2018. The disclosures of the above-listed applications are hereby incorporated by reference herein in their entirety.

BACKGROUND

Embodiments of the inventive concept described herein relate to a device for analyzing a sample, and more particularly, relate to a device for analyzing a large-area sample based on an image, a device for analyzing a sample based on an image by using a difference in medium characteristic, and a method for measuring and analyzing a sample by using the same.

Recently, when observing a sample by using an optical microscope, after identifying the whole area of a sample at a lower magnification, the sample has been observed at a higher magnification for a final decision in examining a tissue. However, when observing the sample at the higher magnification, the size of an area (field view) to be determined at a time is reduced. Accordingly, images of the sample have to be combined with each other after the sample is captured like being scanned while moving the lens.

The inventor of the inventive concept has designed a method of arranging several sensors to solve the above problem. However, even in this case, since the sensor has an inactive pixel area, the invalid pixel area of the sensor causes an area, which is not captured, of the sample.

In general, it is difficult to analyze components of the sample based on an image using the optical microscope. Accordingly, a procedure of dyeing the sample is performed to analyze the components of the sample based on the image and a procedure of determining the dyed sample using the optical microscope is performed. In this case, inconveniently, the procedure of dyeing the sample has to be performed.

In addition, to exactly determine a specific dyed part of the sample, after a wider image captured at the lower magnification is primarily used, a narrower image captured at the higher magnification is secondarily used. Accordingly, there has been required an optical microscope having multiple-magnification lenses to obtain the image captured at the lower magnification and the image captured at the higher magnification, and a sample image, which is partially expanded, has to be inconveniently additionally obtained.

In addition, according to the conventional optical microscope, since the sample and a sensor unit are spaced apart from each other by a specific distance, the fine difference between media of a sample is failed to be exactly detected based on an image.

SUMMARY

Embodiments of the inventive concept to solve the problems may provide a device for analyzing a large-area sample, capable of analyzing the sample through a plurality of sensors.

In addition, embodiments of the inventive concept may provide a device for analyzing a large-area sample, capable of sensing the sample while a sensor is moving.

In addition, embodiments of the inventive concept may provide a device for precisely analyzing a sample, without a plurality of optical lenses.

In addition, embodiments of the inventive concept may provide a device for analyzing a sample, capable of determining components of the sample using the difference in medium characteristic, even if the sample is not dyed In addition, embodiments of the inventive concept may provide a device for analyzing a sample, capable of obtaining image data on a cell included in the sample by irradiating light having multiple wavelengths and by using sensing data sensed for each wavelength.

In addition, embodiments of the inventive concept may provide a device for analyzing a sample, capable of precisely analyzing the sample by moving a light source.

In addition, embodiments of the inventive concept may provide a device for analyzing sample, capable of exactly analyzing the sample by focusing light of a light source through a focusing lens.

In addition, embodiments of the inventive concept may provide a method for measuring and analyzing a sample by using a device for analyzing the sample, which is capable of recognizing a fine difference of the sample through calibration.

The objects of the inventive concept are not limited to the above, but other effects, which are not mentioned, will be apparently understood to those skilled in the art.

According to an exemplary embodiment, a device for analyzing a large-area sample includes a first sensor array including a plurality of sensors which are disposed while being spaced apart from each other in a first direction, a second sensor array including a plurality of sensors, which are disposed while being spaced apart from each other in the first direction, and spaced apart from the first sensor array in a second direction, and a control unit to obtain image data for a cell included in the sample by using sensing data of the sensor on the sample, in which the sample is interposed between the first sensor array and the second sensor array. An active area of one of the sensor in the first sensor array overlaps an active area of one of the sensors in the second sensor array, in the second direction.

According to an exemplary embodiment, a device for analyzing a large-area sample includes a sensor to perform a sensing operation while moving in one direction, a light source disposed to be spaced apart from the sensor, and a control unit to obtain image data for a cell included in a sample by using sensing data of the sensor on the sample, in which the sample is interposed between the sensor and the light source. The sensing data is obtained by sensing the sample from one side of the sample to an opposite side of the sample.

According to an exemplary embodiment, a device for analyzing a sample in a direct contact manner includes a light source to irradiate light having mutually different wavelengths to the sample with a time difference, a sensor unit to sense data on the sample, as the light source irradiates light for each wavelength, in which the sample is positioned to be adjacent to the sensor unit, and a control unit to obtain image data on components included in the sample by using the sensing data of the sensor unit for each wavelength, as the light source irradiates light with respect to the wavelength.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
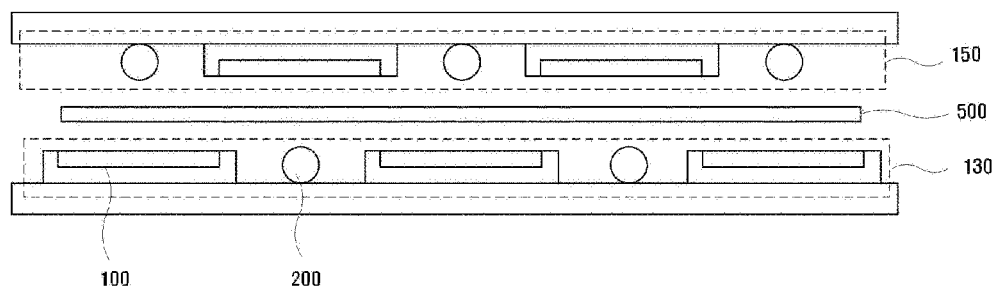
FIGS. 1 and 2 are front views illustrating a device for analyzing a large-area sample, according to an embodiment of the inventive concept.

Advantage points and features of the inventive concept and a method of accomplishing thereof will become apparent from the following description with reference to the following drawings, wherein embodiments will be described in detail with reference to the accompanying drawings. However, the inventive concept may be embodied in various different forms, and should not be construed as being limited only to the illustrated embodiments. Rather, these embodiments are provided as examples so that the inventive concept will be thorough and complete, and will allow those skilled in the art to fully understand the scope of the inventive concept. The inventive concept may be defined by scope of the claims.

The terminology used herein is provided for explaining embodiments, but the inventive concept is not limited thereto. As used herein, the singular terms "a," "an" and "the" are intended to include the plural forms as well, unless the context clearly indicates otherwise. Furthermore, it will be further understood that the terms "comprises", "comprising," "includes" and/or "including", when used herein, specify the presence of stated elements, steps, operations, and/or devices, but do not preclude the presence or addition of one or more other components, steps, operations and/or devices. The same reference numerals will be assigned to the same component throughout the whole specification, and "and/or" refers to that components described include not only individual components, but at least one combination of the components. It will be understood that, although the terms "first", "second", etc., may be used herein to describe various components, these components should not be limited by these terms. These terms are only used to distinguish one component from another component. Thus, a first component to be described below may be a second component without departing from the teachings of the inventive concept.

Unless otherwise defined, all terms (including technical and scientific terms) used herein have the same meaning as commonly understood by those skilled in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the inventive concept will be described with reference to accompanying drawings.

Figure 2:
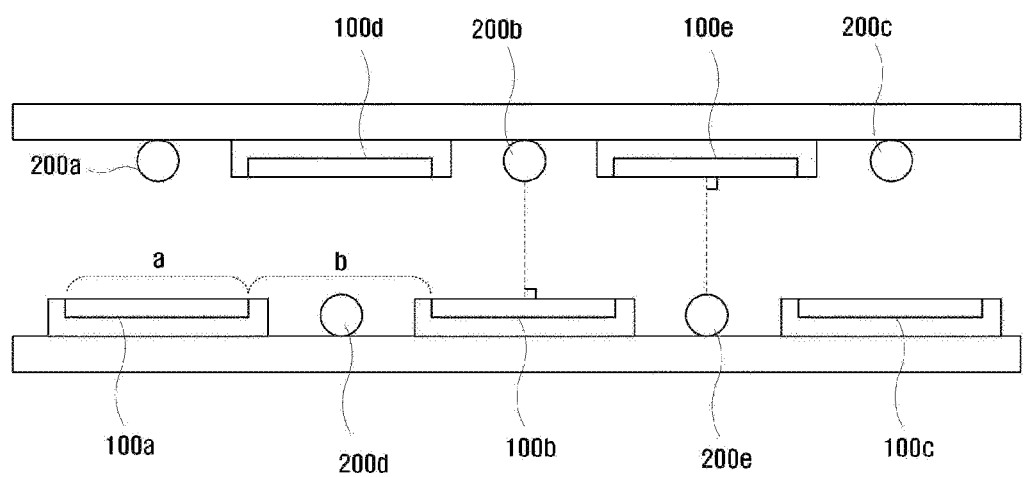

FIGS. 1 and 2 are front views illustrating a device 10 for analyzing a sample, according to an embodiment of the inventive concept.

In detail, FIG. 2 illustrates that a sample 500 of FIG. 1 is removed to show the structure of the device 10 for analyzing a large-area sample.

Hereinafter, the device 10 for analyzing the sample will be described with reference to FIGS. 1 and 2, according to an embodiment of the inventive concept.

According to an embodiment of the inventive concept, the device 10 for analyzing the large-area sample includes a sensor support part, a first sensor array 130 located on the sensor support part, a second sensor array 150 located on the sensor support part, a light source 200 located on the sensor support part, and a control unit 300.

A plurality of sensors 100 are disposed in the first sensor array 130 and the second sensor array 150, while being spaced apart from each other.

In this case, the sensor 100 described according to an embodiment of the inventive concept refers to all sensors 100 included in the first sensor array 130 and the second sensor array 150. The sensor 100 may include an active area 100-1 to actually form an image, as a pixel is positioned therein, and an inactive area 100-2 in which an image is not formed.

According to an embodiment, the first sensor array 130 is provided at a lower portion of the device 10 for analyzing the sample and has the sensors 100 spaced apart from each other. The second sensor array 150 is provided at an upper portion of the device 10 for analyzing the sample and has the sensors 100 spaced apart from each other.

In detail, the second sensor array 150 is disposed to face the first sensor array 130, and the sensors 100 in the first sensor array 130 overlap the sensors 100 in the second sensor array 150 in the direction in which the first sensor array 130 and the second sensor array 150 face each other. In detail, active areas 100-1 of the sensors 100 in the first sensor array 130 overlap active areas 100-1 of the sensors 100 in the second sensor array 150 in the direction in which the first sensor array 130 faces the second sensor array 150.

The entire surfaces of the sample 500 disposed may be sensed through all sensors 100 disposed in the device 10 for analyzing the sample.

In other words, the sensors 100 in the first sensor array 130 and the second sensor array 150 are disposed to face each other while being offset from each other. Alternatively, the sensors 100 of the first sensor array 130 and the second sensor array 150 may be arranged in a zig-zag manner.

In addition, the first sensor array 130 and the second sensor array 150 are disposed to face each other while being spaced apart from each other such that the sample 500 is disposed.

The light source 200 is disposed to face each sensor 100.

The control unit 300 obtains image data on a cell included in the sample 500 by using sensing data of the sensor 100 on the sample 500 interposed between the first sensor array 130 and the second sensor array 150.

Hereinafter, the structure of the device 10 for analyzing the sample will be described in more detail with reference to FIG. 2, according to an embodiment of the inventive concept.

Referring to FIG. 2, according to an embodiment of the inventive concept, the sensor 100 of the device 10 for analyzing the sample includes a first sensor 100a, a second sensor 100b, a third sensor 100c, a fourth sensor 100d, and a fifth sensor 100e, and the light source 200 includes a first light source 200a, a second light source 200b, a third light source 200c, a fourth light source 200d, and a fifth light source 200e.

In addition, the sensors 100, which are in the first sensor array 130, are spaced apart from each other by a first distance in a first direction. The sensors 100, which are in the second sensor array 150, are spaced apart from each other by the first distance in the first direction. In addition, the first sensor array 130 and the second sensor array 150 are spaced apart from each other by a specific distance in a second direction perpendicular to the first direction.

Referring to FIG. 2, the sensors 100 in the first sensor array 130 and the second sensor array 150 are spaced apart from each other by the first distance in a horizontal direction, and the first sensor array 130 is spaced apart from the second sensor array 150 by a specific distance in a vertical direction.

In this case, the first distance is narrower than the first-directional width of the active area 100-1 of the sensor 100. Accordingly, the active areas 100-1 of the sensors 100 in the first sensor array 130 may overlap the active areas 100-1 of the sensors 100 in the second sensor array 150 in the direction in which the first sensor array 130 and the second sensor array 150 face each other.

For example, a width "a" of the active area 100-1 of the first sensor 100a may be wider than the spacing "b" between the first sensor 100a and the second sensor 100b. Accordingly, the whole area of the sample 500 may be sensed without an empty space through the first sensor 100a, the second sensor 100b, the third sensor 100c, the fourth sensor 100d, and the fifth sensor 100e.

For another example, ends of the active areas 100-1 of the sensors 100, which face each other, may overlap each other by a specific distance. In addition, the control unit 300 may obtain image data having no duplication, in relation to a part doubly sensed by the overlapped active areas 100-1 of the sensors 100.

For example, a right end of the active area 100-1 of the first sensor 100a overlaps a left end of the active area 100-1 of the fourth sensor 100d by a specific distance. In the same manner, a right end of the active area 100-1 of the fourth sensor 100d overlaps a left end of the active area 100-1 of the second sensor 100b by a specific distance. The same principle is applied to remaining sensors 100.

In addition, the light sources 200 are disposed to face the sensors 100.

For example, the first light source 200a faces the first sensor 100a, the second light source 200b faces the second sensor 100b, the third light source 200c faces the third sensor 100c, the fourth light source 200d faces the fourth sensor 100d, and the fifth light source 200e faces the fifth sensor 100e.

In more detail, an optical axis of the light source 200 is disposed in the second direction toward the center of the facing sensor 100.

Figure 3:
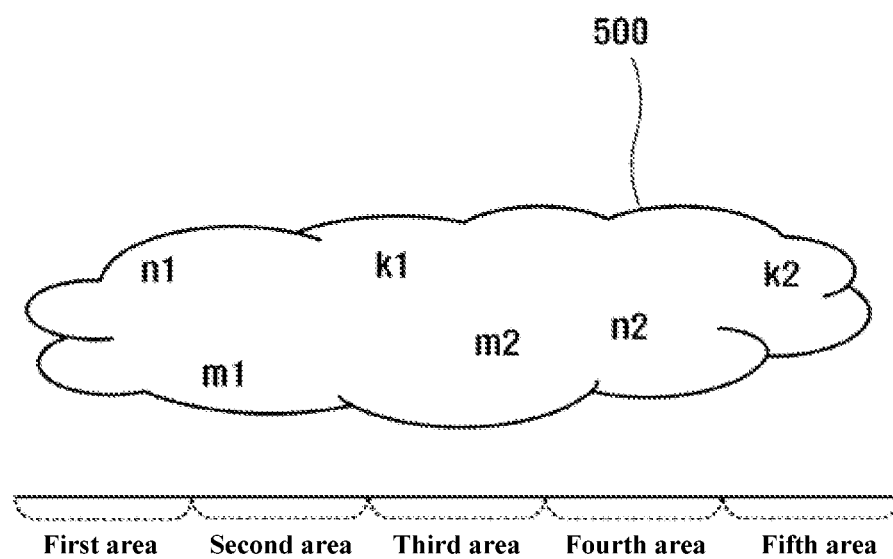
FIG. 3 is a view illustrating a sample, according to an embodiment of the inventive concept.

FIG. 3 is a view illustrating the sample 500 according to an embodiment of the inventive concept. FIGS. 4A to 6B are views illustrating image data sensed with respect to each wavelength and in each area, according to an embodiment of the inventive concept, and FIG. 7 is a view illustrating that the control unit 300 generates a final image obtained by combining image data generated in FIGS. 4A to 6B.

According to an embodiment of the inventive concept, the light source 200 irradiates light having multiple wavelengths.

In addition, the control unit 300 obtains image data on a cell included in the sample 500 by using the sensing data of the sensor 100 for each wavelength, as the light source 200 irradiates light with respect to each wavelength.

In addition, the control unit 300 generates a final image for cells included in the sample 500 by combining the obtained image data.

Hereinafter, the details thereof will be described in more detail with reference to FIGS. 3 to 7.

FIG. 3 is a view illustrating the sample 500 together with components included in the sample 500, and the sample 500 includes cells n1, n2, m1, m2, k1, and k2.

In addition, a first area refers to an area sensed by the first sensor 100a, a second area refers to an area sensed by the second sensor 100b, a third area refers to an area sensed by the third sensor 100c, a fourth area refers to an area sensed by the fourth sensor 100d, and a fifth area refers to an area sensed by the fifth sensor 100e.

In addition, the light source 200 irradiates light having three wavelengths of a first wavelength, a second wavelength, and a third wavelength. The cells n1 and n2 may be detected through the first wavelength. The cells m1 and m2 may be detected through the second wavelength. The cells k1 and k2 may be detected through the third wavelength.

Figure 4A:
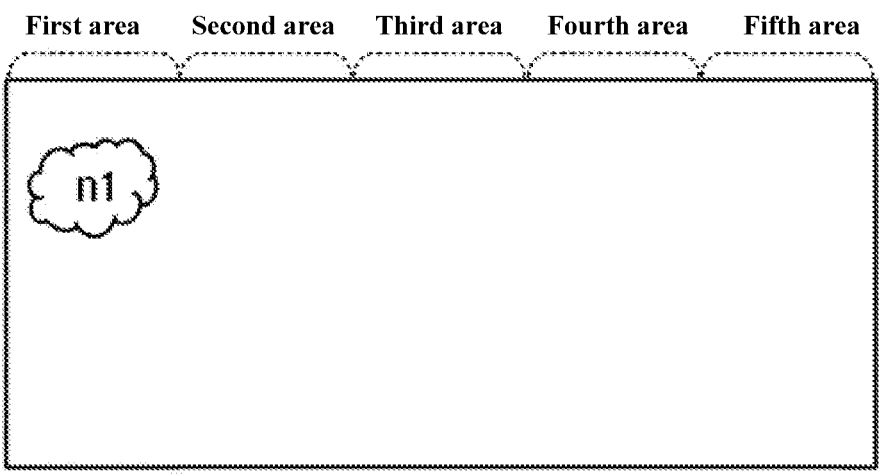
FIGS. 4A to 6B are views illustrating image data sensed with respect to each wavelength and in each area, according to an embodiment of the inventive concept.
Figure 4B:
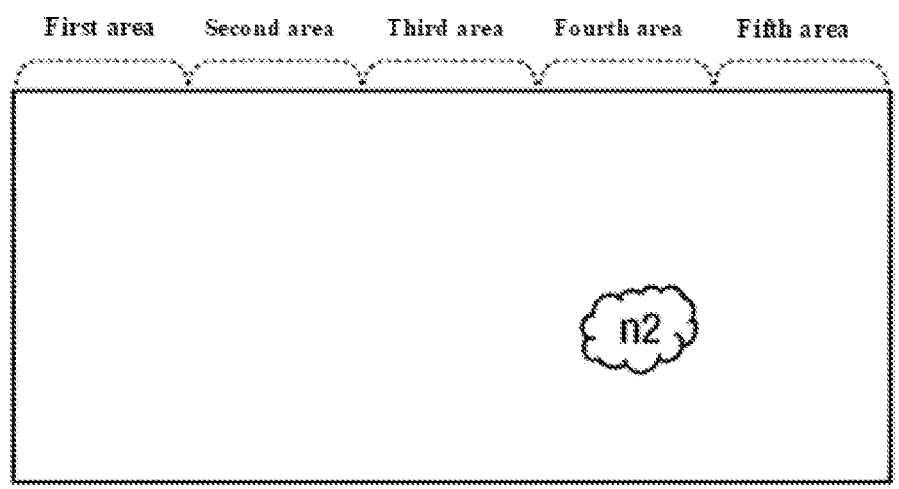

FIGS. 4A and 4B are views illustrating image data of a cell included in the sample 500, in which the image data is obtained using data sensed by the first sensor 100a to the fifth sensor 100e, as the light source 200 irradiates light having the first wavelength.

Since the cell n1 is in the first area, the cell n1 may be sensed by the first sensor 100a. Since the cell n2 is in the fourth area, the cell n2 may be sensed by the fourth sensor 100d.

In addition, the cells m1, m2, k1, and k2 were not detected through the first wavelength.

Figure 5A:
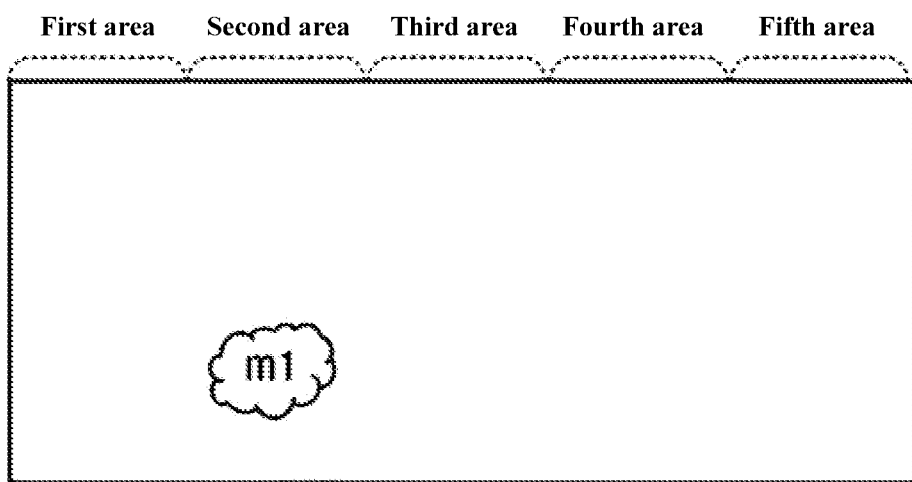
Figure 5B:
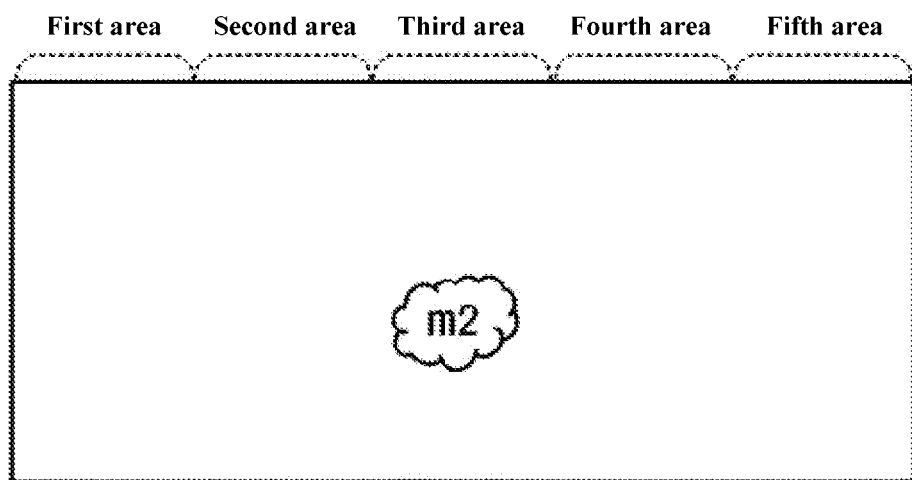

FIGS. 5A and 5B are views illustrating image data of a cell included in the sample 500, in which the image data is obtained using the data sensed by the first sensor 100a to the fifth sensor 100e, as the light source 200 irradiates light having the second wavelength.

Since the cell m1 is in the second area, the cell m1 may be sensed by the second sensor 100b. Since the cell m2 is in the third area, the cell m2 may be sensed by the third sensor 100c.

In addition, the cells n1, n2, k1, and k2 were not detected through the second wavelength.

Figure 6A:
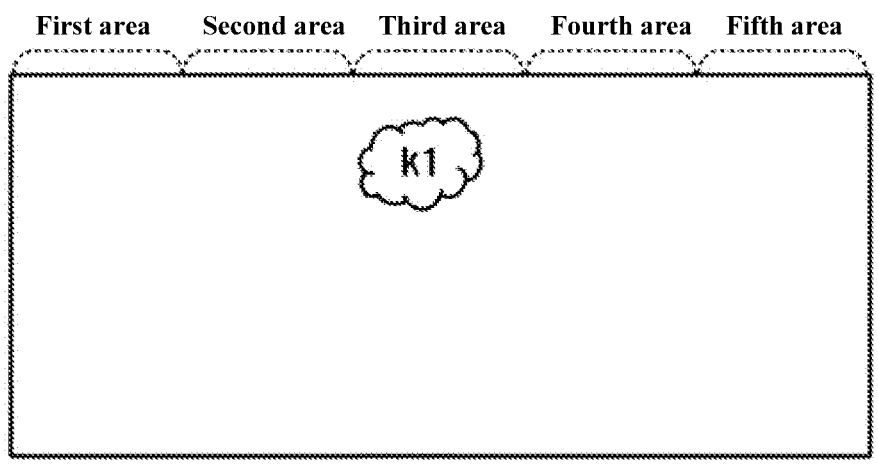
Figure 6B:
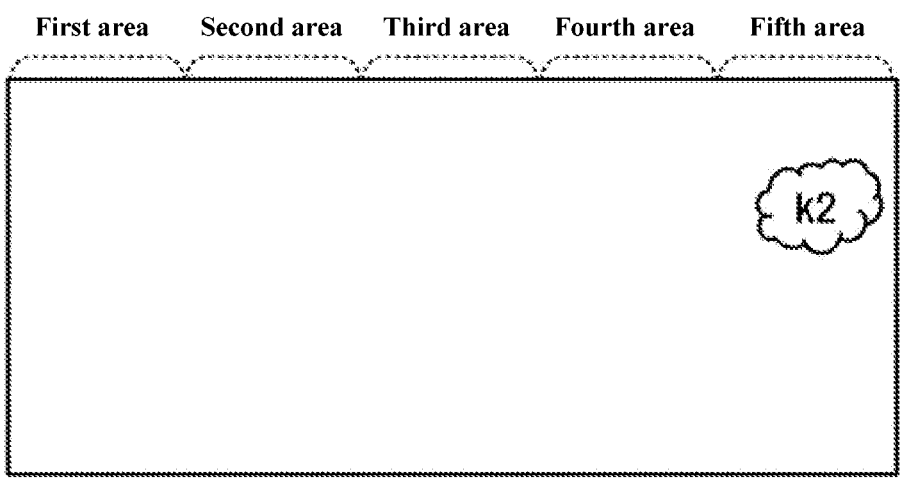
Figure 7:
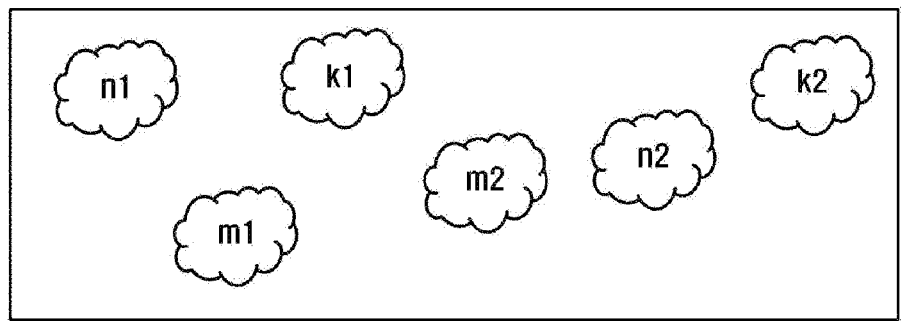
FIG. 7 is a view illustrating that a control unit generates a final image by combining image data generated in FIGS. 4A to 6B.

FIGS. 6A and 6B are views illustrating image data of a cell included in the sample 500, in which the image data is obtained using the data sensed by the first sensor 100a to the fifth sensor 100e, as the light source 200 irradiates light having the third wavelength.

Since the cell k1 is in the third area, the cell k1 may be sensed by the third sensor 100c. Since the cell k2 is in the fifth area, the cell k2 may be sensed by the fifth sensor 100e.

In addition, the cells n1, n2, m1, and m2 were not detected through the third wavelength.

FIG. 7 is a view illustrating a final image obtained by combining image data of the cells n1, n2, m1, m2, k1, and k3 detected in FIGS. 4A to 6B.

According to an embodiment of the inventive concept, the device 10 for analyzing the sample may analyze the sample 500 having a large area, through the above structure and the above operation. In addition, the device 10 for analyzing the sample may generate image data on a sample by irradiating light having multiple wavelengths, without dyeing the sample.

In addition, the control unit 300 may analyze a cell included in the sample 500 by matching the obtained image data with a plurality of cell images, which is previously stored in a database. In addition, the control unit 300 allows information on image data, which is received from a user, to be stored in the database.

Accordingly, the image data, which is illustrated in FIGS. 3 to 7 and collected, of the cells n1, n2, m1, m2, k1, and k2 is matched with the cell images stored in the database to determine the matching state.

To this end, preferably, the images for the cells and information on each cell are stored in the database.

In addition, image data, which is not matched, may be failed to be matched, or image data may be absent. Accordingly, a result data from the direct analysis by the user is input, and is stored to be utilized thereafter.

Hereinafter, a method for forming an image according to an embodiment of the inventive concept will be described with reference to FIGS. 8 and 9.

Figure 8:
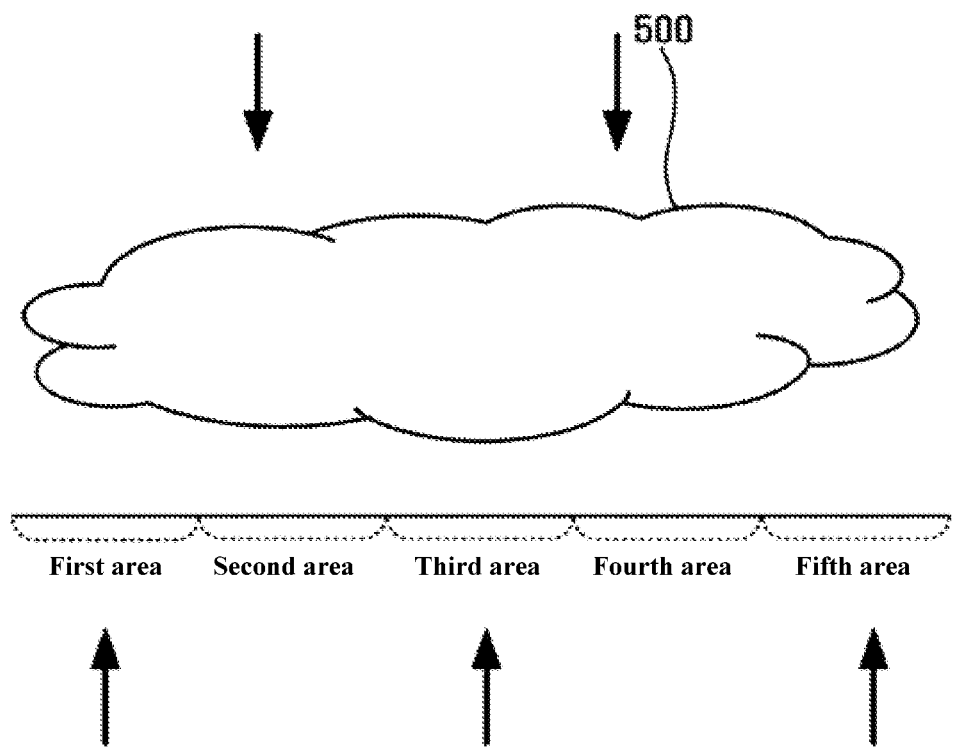
FIGS. 8 and 9 are views illustrating a method for forming an image, according to an embodiment of the inventive concept.
Figure 9:
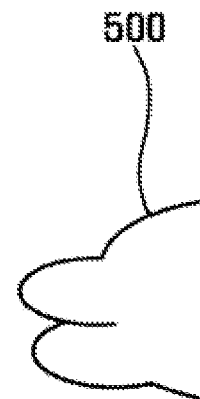

Referring to FIG. 8, the sample 500 is divided into five areas to be formed as images, and the areas are formed as images through mutually different sensors 100. The direction, in which the sensor 100 forms the images of the sample 500, is illustrated. Referring to FIG. 9, an image formed by one sensor 100 is illustrated. Finally, image data, which is imaged by each sensor 100, is reconstructed and the final image data is determined.

Figure 10:
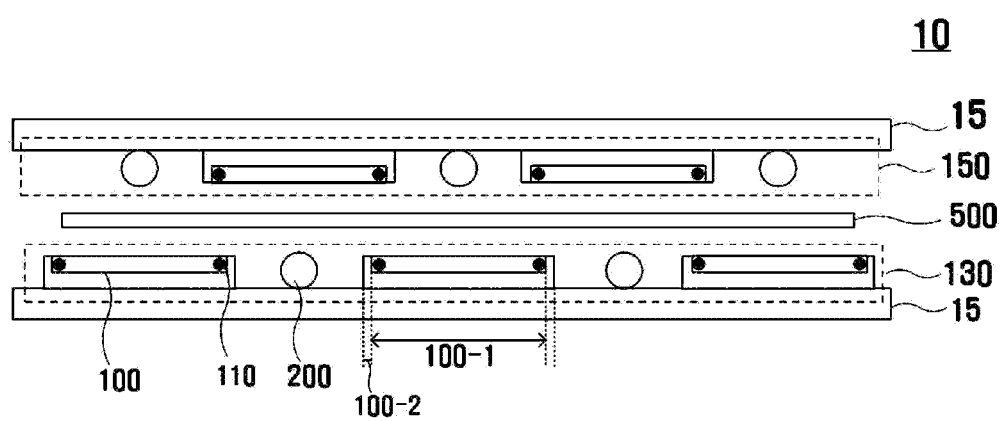
FIG. 10 is a front view illustrating a device for analyzing a large-area sample, according to another embodiment of the inventive concept.

FIG. 10 is a front view illustrating a device for analyzing a large-area sample, according to another embodiment of the inventive concept.

Hereinafter, an alignment mark 110 formed in the active area 100-1 of the sensor 100 will be described with reference to FIG. 10. According to an embodiment of the inventive concept, the sensor 100 included in the first sensor array 130 and the sensor 100 included in the second sensor array 150 have to be aligned. In this case, the sensor 100 included in the first sensor array 130 and the sensor 100 included in the second sensor array 150 are able to be precisely aligned using the alignment mark 110. In addition, the formed images may be reconstructed by using the alignment mark 110.

Figure 11:
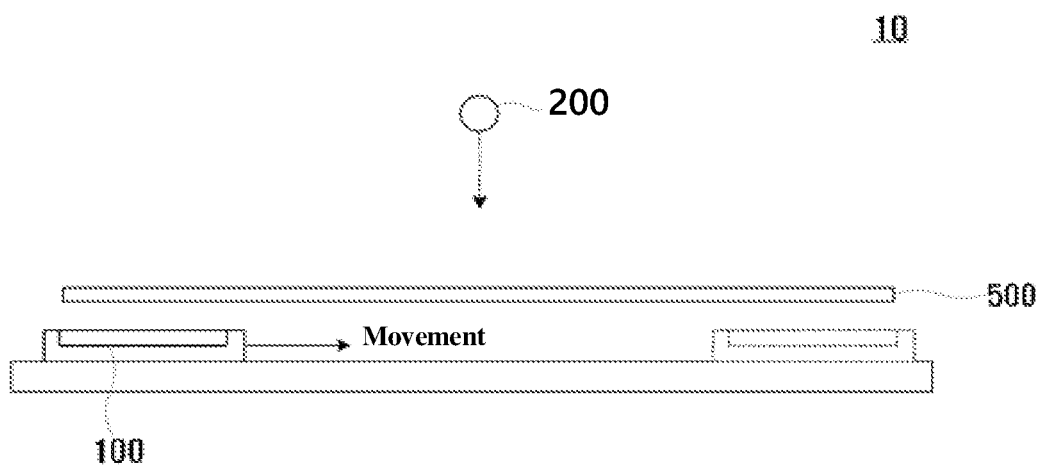
FIGS. 11 and 12 are front views illustrating a device for analyzing a large-area sample, according to a second embodiment of the inventive concept.
Figure 12:
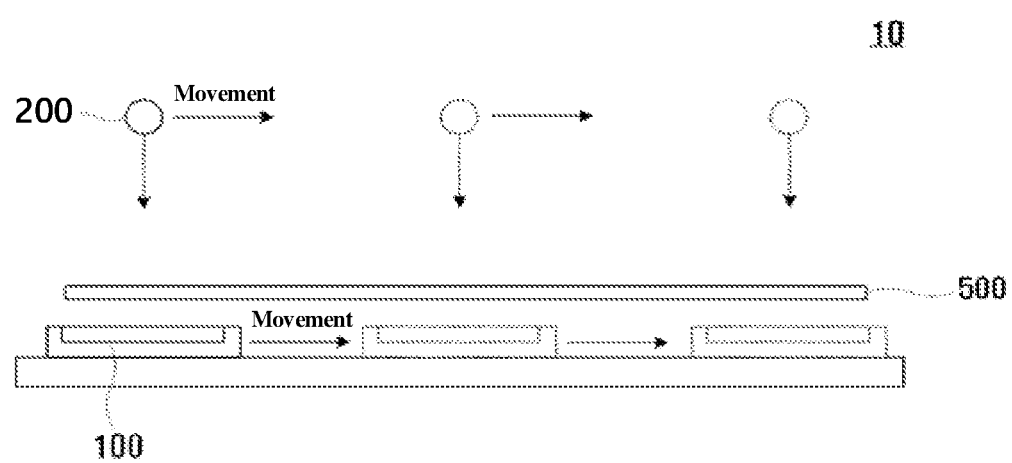

FIGS. 11 and 12 are front views illustrating the device 10 for analyzing the sample having a large area, according to a second embodiment of the inventive concept.

Hereinafter, the device 10 for analyzing the sample having the large area will be described with reference to FIGS. 11 and 12, according to a second embodiment of the inventive concept.

According to the second embodiment of the inventive concept, the device 10 for analyzing the sample includes the sensor 100, the light source 200, and the control unit 300.

According to an embodiment, the sensor 100 performs a sensing operation while moving in one direction.

According to an embodiment, the sensor 100 is disposed at a lower portion of the device 10 for analyzing the sample and provided to be movable in one direction.

The light source 200 is spaced apart from the sensor 100. According to an embodiment, the light source 200 is disposed at an upper portion of the device 10 for analyzing the sample and disposed to face the sensor 100.

The control unit 300 obtains image data on a cell included in the sample 500 by using the sensing data of the sensor 100 on the sample 500 interposed between the sensor 100 and the light source 200.

In addition, the sensing data sensed by the sensor 100 may refer to data obtained by sensing the sample 500 from one side to an opposite side of the sample 500.

For example, the sensor 100 starts from one side of the sample 500 and moves in a longitudinal direction of the sample 500 while sensing data on the sample 500.

According to an embodiment, the sensor 100 moves in the first direction, and the light source 200 is disposed such that the optical axis of the light source 200 is disposed in the second direction perpendicular to the first direction.

In addition, as illustrated in FIG. 12, the light source 200 may be disposed to face the sensor 100, and may be provided to be moved in the same direction as that of the sensor 100 at the same speed as that of the sensor 100.

Accordingly, the light source 200 moves in the first direction together with the sensor 100 in the state that the optical axis of the light source 200 is disposed toward the center of the sensor 100. In this case, the light source 200 moves at the same speed as that of the sensor 100 such that the optical axis is always directed toward the center of the sensor 100.

Accordingly, the error may be prevented from being caused due to the change in angle of light irradiated.

According to an embodiment, the sensor 100 may move in the unit of the first distance and sense data on the sample 500. In addition, the first distance is the same as the first-directional width of the sensor 100.

According to another embodiment, the first distance may be shorter than the first-directional width of the sensor 100, by a specific distance, and an area, which is sensed while being overlapped (duplicated), is filtered out through the control unit 300

Accordingly, since the sensor 100 may senses the whole sample 500 from one side of the sample 500 to an opposite side of the sample 500 while moving, the sample having a large area may be analyzed.

In addition, the light source 200 irradiates light having multiple wavelengths and the control unit 300 obtains image data on a cell included in the sample 500 by using the sensing data of the sensor 100 for each wavelength, as the light source 200 irradiates the light with respect to each wavelength.

In addition, the sensor 100 moves while reciprocating several times from one side to an opposite side. In this case, the light source 200 irradiates light having a different wavelength whenever the sensor 100 reciprocates.

In addition, the control unit 300 obtains image data on a cell included in the sample 500 by using the sensing data of the sensor 100 for each wavelength, as the light source 200 irradiates light with respect to each wavelength.

For example, when the light source 200 irradiates light having three wavelengths of a first wavelength, a second wavelength, and a third wavelength in total, the sensor 100 moves while reciprocating three times from one side toward an opposite side of the device 10 for analyzing the sample.

In addition, the light source 200 irradiates light having the first wavelength in first movement of the sensor 100, irradiates light having the second wavelength in second movement of the sensor 100, and irradiates light having the third wavelength, thereby sensing data for each wavelength.

According to another embodiment, whenever the sensor 100 moves in unit of the first distance, the light source 200 irradiates light having multiple wavelengths, and the control unit 300 obtains image data on a cell included in the sample 500, by using the sensing data of the sensor 100 for each wavelength, which results from light irradiated for each wavelength by the light source 200.

For example, light is irradiated with the first wavelength, the second wavelength, and the third wavelength and sensing data for each wavelength is obtained in the first area. Then, light is irradiated with the first wavelength, the second wavelength, and the third wavelength and the sensor 100 obtains sensing data for each wavelength, after the sensor 100 stops in the second area by moving by the first distance from the first area. In addition, light is irradiated with the first wavelength, the second wavelength, and the third wavelength and the sensor 100 obtains sensing data for each wavelength, after the sensor stops in a third area by moving by the first distance from the second area.

The sensor 100 may move in two manners described above and sense data such that the sensed data is obtained for each wavelength.

In addition, the control unit 300 combines image data obtained in such a manner, and generates the final image for cells included in the sample 500.

Since this is identical to the example described with reference to FIGS. 3 to 6B, except that a plurality of sensors 100 are disposed and that one sensor 100 performs a sensing operation while moving, the details thereof will be omitted.

For example, the sensor 100 performs a sensing operation in the first area, moves by the first distance, perform a sensing operation in the second area, moves by the first distance, performs a sensing operation in the third area, moves by the first distance, performs a sensing operation in the fourth area, moves by the first distance, performs a sensing operation in the fifth area, which refers to that the sensor 100 senses a different cell for each wavelength.

In addition, the control unit 300 may analyze a cell included in the sample 500 by matching the obtained image data with a plurality of cell images previously stored in the database. In addition, the control unit 300 allows information on image data, which is received from a user, to be stored in the database.

In addition, according to an embodiment of the inventive concept, a holder for the sensor 100 or the sample 500 of the device 10 for analyzing the sample may include a color filter.

Accordingly, as the device 10 for analyzing the sample includes the color filter, image data sensed by the sensor 100 has a color, so the sample 500 may obtain the same effect, without being dyed.

Hereinafter, a device 20 for analyzing the sample based on an image by using the difference in a medium characteristic.

Figure 13:
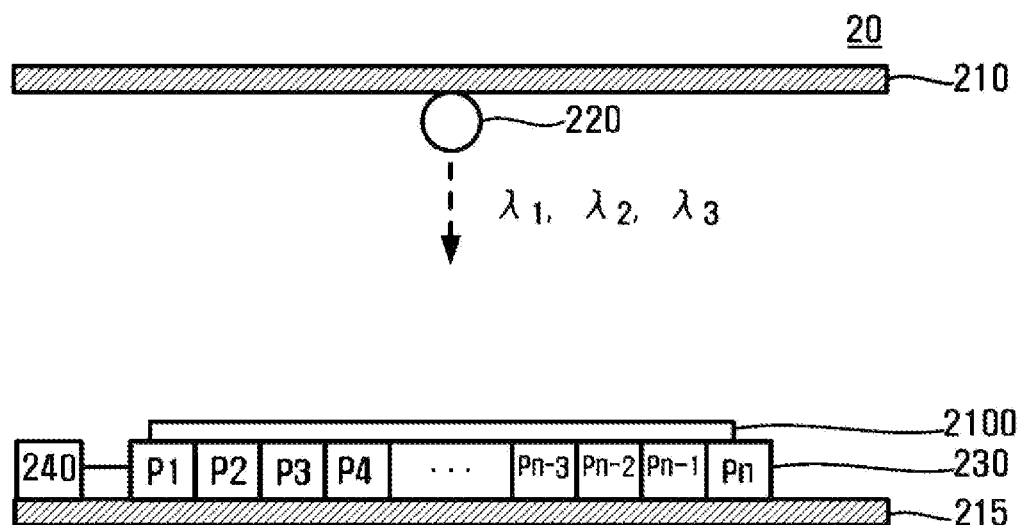
FIG. 13 is a front view illustrating a device for analyzing a sample, according to an embodiment of the inventive concept.

FIG. 13 is a front view illustrating the device 20 for analyzing a sample, according to an embodiment of the inventive concept.

Hereinafter, the device 20 for analyzing the sample will be described with reference to FIG. 13, according to an embodiment of the inventive concept.

The device 20 for analyzing the sample includes a light source support part 210, a sensor support part 215, a light source 220, a sensor unit 230, and a control unit 240.

The light source 220 is supported by the light source support part 210 to irradiate light having multiple wavelengths, which are different from each other, to a sample 2100. In this case, the light source 220 irradiates multiple lights having mutually different wavelengths to the sample 2100 with a time difference, instead of simultaneously irradiating light, such as white light, having multiple wavelengths to the sample 2100.

According to an embodiment, the light source 220 is disposed on the light source support part 210 at the upper portion of the device 20 for analyzing the sample, and irradiates light in the direction of the sample 2100 and the sensor unit 230 disposed under the light source 220.

According to an embodiment of the inventive concept, light having the first wavelength, the second wavelength, and the third wavelength is provided by way of example. In this case, the first wavelength to the third wavelength may be in mutually different wavelength bands.

In this case, the type of each wavelength and the number of wavelengths may be easily selected by a conductor of the inventive concept.

The sensor unit 230 senses data on the sample 2100, as the light source 220 irradiates light for each wavelength. In this case, although the sensor unit 230 is defined as including a sensor package in addition to the sensor, the sensor unit 230 may include a plurality of sensors and may obtain image data in unit of each pixel P.

The control unit 240 obtains image data on a cell included in the sample 2100 by using the sensing data of the sensor unit 230 for each wavelength, as the light source 220 irradiates light with respect to each wavelength.

For example, when the light is irradiated in the state that the sample 2100 is absent, the sensor unit 230 senses data on light irradiated from the light source 220. However, when the sample 2100 is disposed and a specific cell is included in the sample 2100, an area, in which the cell is present, is sensed with data different from those of other areas due to the difference in light characteristic between media.

Depending on the characteristics of internal components included in the sample (cell), the degree of response to the wavelength of light is varied. Accordingly, the intensity of light applied to pixels of the sensor unit 230 is varied. The sensor unit 230 senses that the intensity of light is varied. In addition, the control unit 300 obtains image data on the cell included in the sample 2100 by using the sensing data of the sensor unit 230.

In this case, the control unit 240 generates a final image for cells included in the sample 2100 by combining image data on a cell for each wavelength, which is obtained by using the sensing data of the sensor unit 230 for each wavelength, as light having each wavelength is irradiated.

According to an embodiment, the sensor unit 230 is disposed on the bottom surface of the device 20 for analyzing the sample 2100, and the light source 220 is disposed such that the optical axis of the light source 220 is perpendicular to the surface of the sensor unit 230. In addition, the optical axis of the light source 220 is directed toward the center of the sensor unit 230.

In addition, according to an embodiment of the inventive concept, since the device 20 for analyzing the sample operates in a direct contact manner, the sample 2100 may be positioned to directly make contact with the top surface of the sensor unit 230.

According to an embodiment of the inventive concept, in the device 20 for analyzing the sample in the direct contact manner, since the sensor unit 230 directly makes contact with the sample 2100, each pixel of the sensor unit 230 may receive data on light passing through a specific portion, which is positioned directly on the pixel to make contact with the pixel, of the sample 2100, thereby minimizing the influence exerted by data on light passing through another specific portion, which makes contact with a top surface of another pixel, of the sample 2100. According to the present embodiment, when the device 20 for analyzing the sample is used, the fine difference between media of the sample 2100 may be exactly detected in the form of an image.

Figure 14:
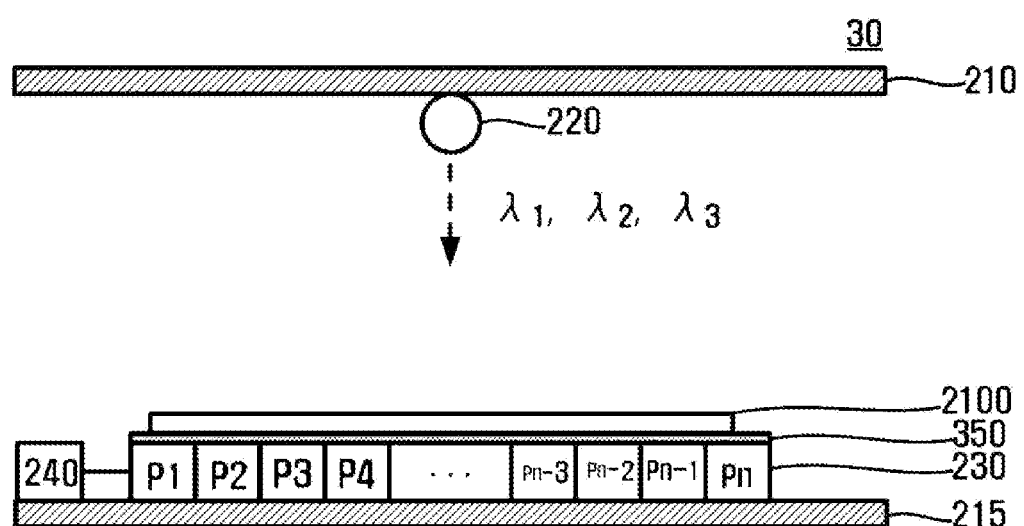
FIG. 14 is a front view illustrating a device for analyzing a sample, according to another embodiment of the inventive concept.

However, according to some embodiments, referring to FIG. 14, a sample holder 350 may be positioned between the sample 2100 and the sensor unit 230. Since the sample holder 350 has a fine thickness, a device 30 for analyzing the sample illustrated in FIG. 14 may exactly detect the fine difference between media of the sample 2100 in the direct contact manner.

According to the inventive concept, the sample 2100 may be analyzed without an additional dyeing process, and the details thereof will be described below in detail.

When irradiating the light to cells included in the sample 2100 and visualizing the cells through the sensor unit 230, a line of a white blood cell is not viewed. Accordingly, when irradiating the light, the light needs to be irradiated with respect to each of RGB wavelengths instead of white light. When light having wavelengths in mutually difference bands is irradiated, the difference is made between data values sensed by the sensor unit 230 for light passing through a blood cell, due to the difference in medium characteristic between components constituting the blood cell. Since an image of the components constituting the blood cell is made using the difference between the data values, the components constituting the blood cell may be identified without an additional dyeing process.

Figure 16A:
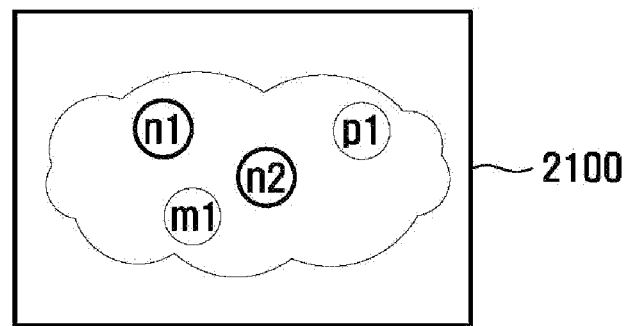
FIGS. 16A to 16C are views illustrating image data sensed with respect to each of a plurality of wavelengths, according to an embodiment of the inventive concept.
Figure 16B:
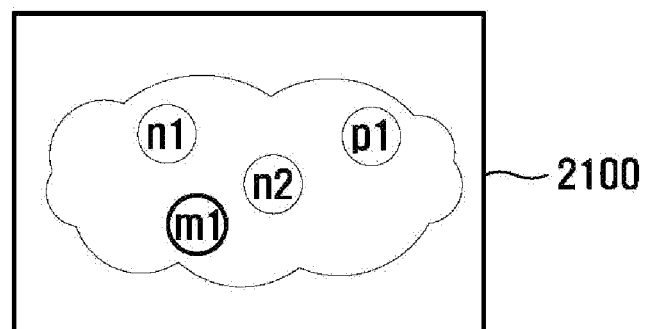
Figure 16C:
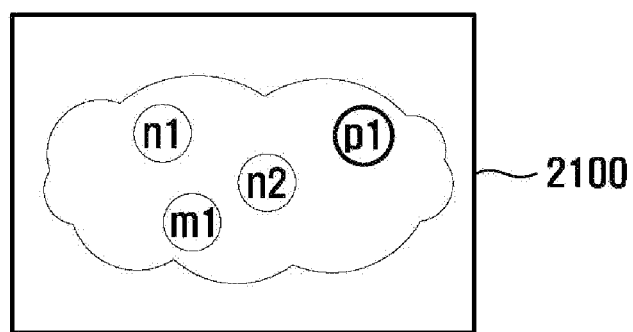
Figure 17:
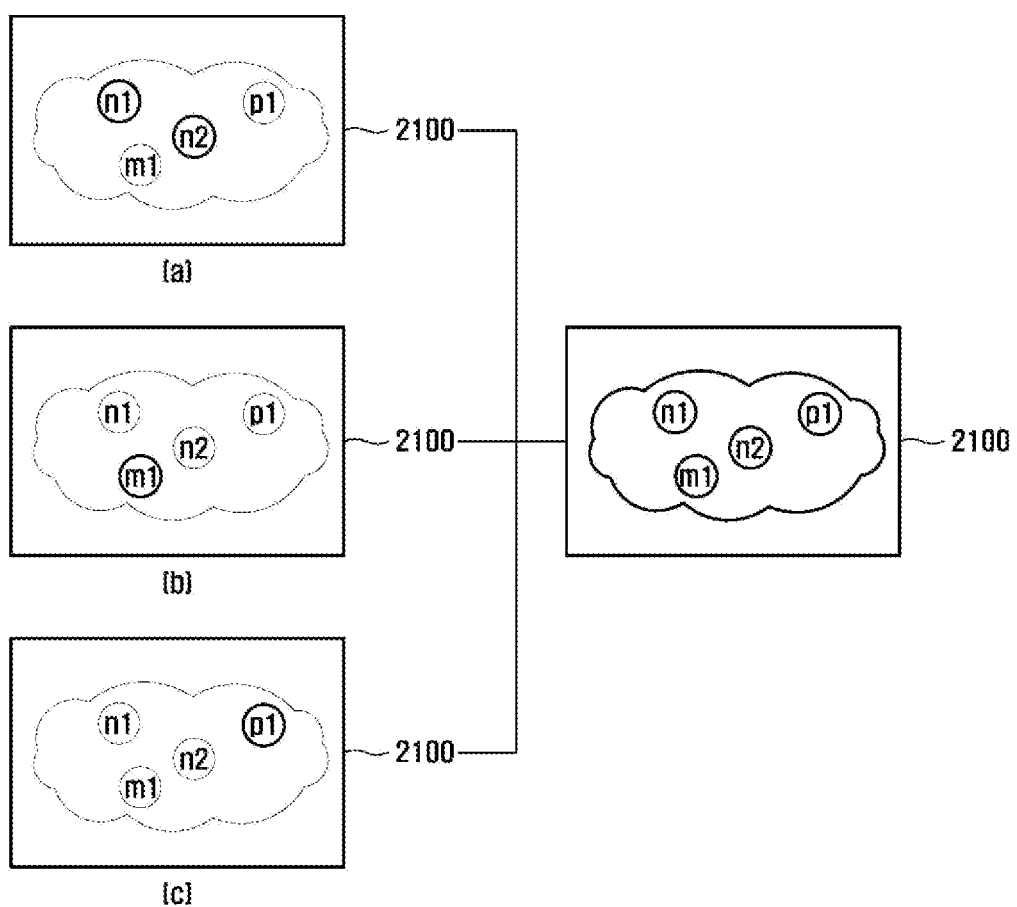
FIG. 17 is a view illustrating that a control unit generates a final image by combining image data sensed as illustrated in FIGS. 16A to 16C.

Hereinafter, an embodiment of the inventive concept will be described with reference to FIGS. 15 to 17. FIGS. 15 to 17 are views illustrating that a cell image is obtained using sensing data resulting from light irradiated with respect to each wavelength as described above with reference to FIG. 13, and FIG. 15 is a view illustrating cells included in the sample 2100 according to an embodiment of the inventive concept. FIGS. 16A to 16C are views illustrating image data sensed with respect to each of the plurality of wavelengths, according to an embodiment of the inventive concept. FIG. 17 is a view illustrating that the control unit 240 generates the final image by combining image data sensed as illustrated in FIGS. 16A to 16C.

Figure 15:
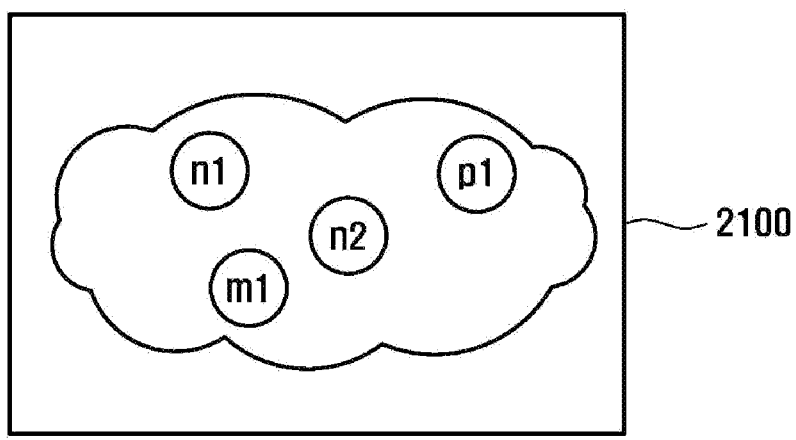
FIG. 15 is a view illustrating cells included in a sample, according to an embodiment of the inventive concept.

It is assumed that the sample 2100 includes components such as cells n1, n2, m1, and p1 as illustrated in FIG. 15.

In addition, the cells n1 and n2 are components showing higher reactivity with respect to the first wavelength from the light source 220, the cell m1 is a component showing a higher reactivity with respect to the second wavelength from the light source 220, and the cell p1 is a component showing a higher reactivity with respect to the third wavelength from the light source 220.

Accordingly, when the first wavelength is irradiated from the light source 220, data on the components (cells n1, n2, m1, and p1), which results from the first wavelength, may be obtained through the sensor unit 230 as illustrated in FIG. 16A. In this case, it may be recognized that images of the cells n1 and n2 are clearer than those of the cells m1 and p1, and the intensity of light passing through the components of the cells n1 and n2 is higher than the intensity of light passing through the components of the cells m1 and p1.

In this case, the images of the cells n1 and n2 are clearer than the images of the cells m1 and p1 due to the difference in the medium characteristic. In detail, the transmittance/absorption rate of the first wavelength is varied for a medium of each of the cells n1, n2, m1, and p1.

In addition, when the second wavelength is irradiated from the light source 220, data on the components (cells n1, n2, m1, and p1), which results from the second wavelength, may be sensed through the sensor unit 230 as illustrated in FIG. 16B, and the control unit 240 obtains image data on the cell m1.

In addition, when the third wavelength is irradiated from the light source 220, data on the components (cells n1, n2, m1, and p1), which results from the third wavelength, may be sensed through the sensor unit 230 as illustrated in FIG. 16C, and the control unit 240 obtains image data on the cell p1.

Referring to FIG. 17, the control unit 240 generates a final image for cells included in the sample 2100 by combining the obtained image data. In other words, the control unit 240 may reconstruct image data resulting from mutually different wavelengths.

Accordingly, a user may analyze cells included in the sample 2100, based on the final image.

Figure 18:
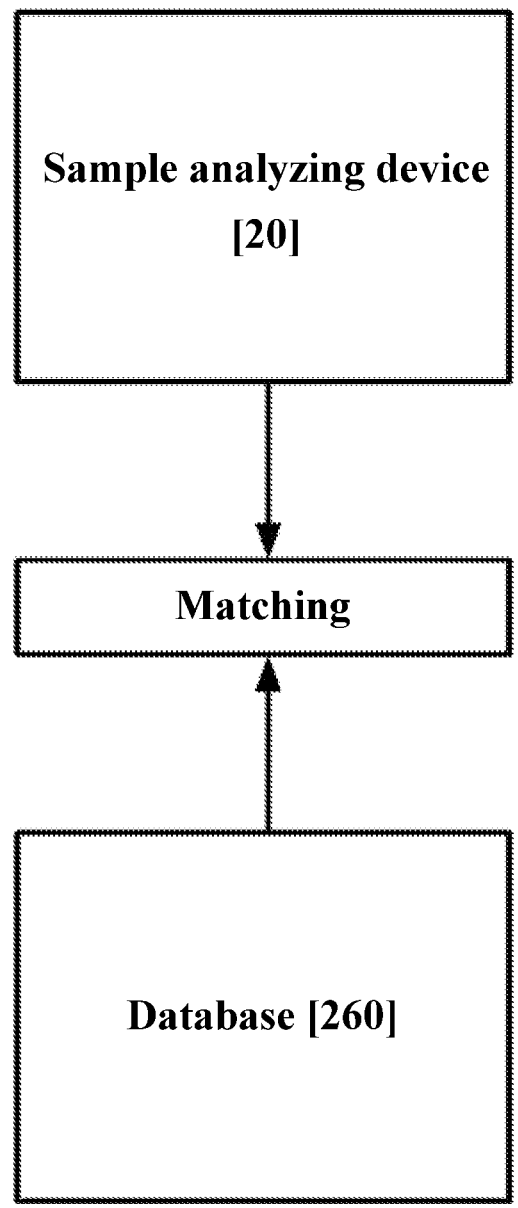
FIG. 18 is a view illustrating that cell images sensed as in FIGS. 16A to 16C and FIG. 17 are matched with a database, according to an embodiment of the inventive concept.

FIG. 18 is a view illustrating that cell images sensed as in FIGS. 16A to 16C and FIG. 17 are matched with a database 260.

Referring to FIG. 18, the control unit 240 matches the obtained image data with data on a plurality of samples, which are previously stored in the database 260, and analyzes the components included in the sample 2100. In addition, the control unit 240 accumulates data by storing the information on the image data input from the user into the database 260.

Accordingly, it may be determined whether the collected image data on the cell n1, n2, m1, or p1 as illustrated in FIGS. 15 to 17 is matched with a medium characteristic (for example, the transmittance, the absorption rate, the refractive angle of a medium for each wavelength) stored in the database 260.

To this end, preferably, the data on the medium characteristic (for example, the transmittance, the absorption rate, the refractive angle of a medium for each wavelength) is stored in the database 260.

In addition, image data, which is not matched, may be failed to be matched, or image data may be absent. Accordingly, a result data from the direct analysis by the user is input, and is stored to be utilized thereafter.

Figure 19:
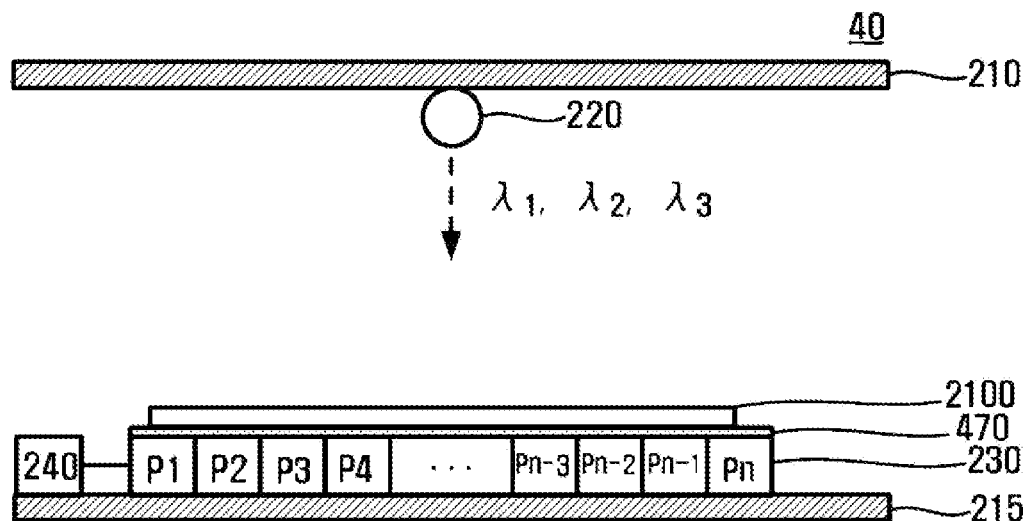
FIG. 19 is a view illustrating that a device for analyzing a sample includes a color filter, according to an embodiment of the inventive concept.

FIG. 19 is a view illustrating that a device 40 for analyzing a sample includes a color filter 470, according to an embodiment of the inventive concept.

Referring to FIG. 19, according to an embodiment of the inventive concept, the device 40 for analyzing the sample further includes the color filter 470.

In more detail, a holder of the sensor unit 230 or the sample 2100 further includes the color filter 470. In this case, the sensor unit 230 is provided on a top surface thereof with the color filter 470. In this case, the color filter 470 may serve as the sample holder 350.

Accordingly, as the device 40 for analyzing the sample includes the color filter 470, image data sensed by the sensor unit 230 has color, so the sample 2100 may obtain the same effect, without being dyed.

Figure 20:
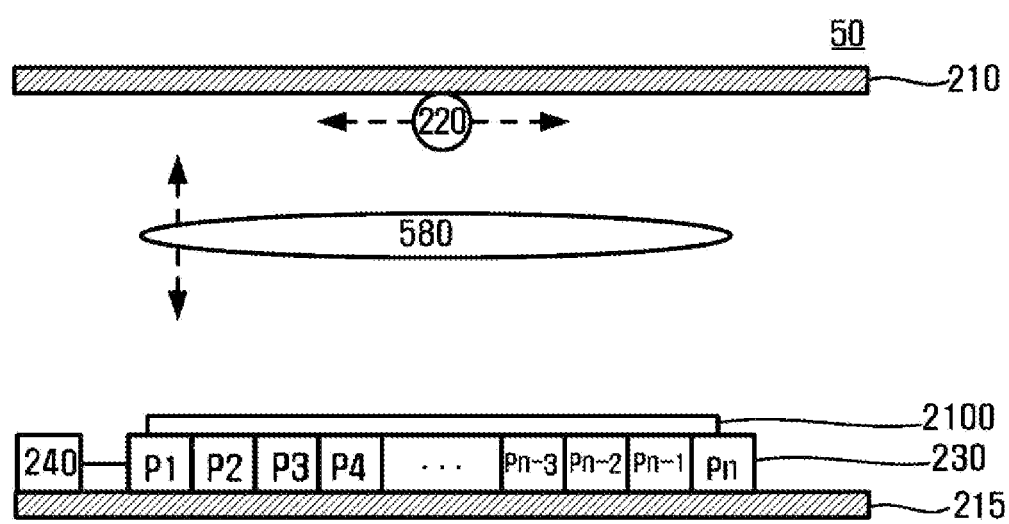
FIG. 20 is a view illustrating that a device for analyzing a sample includes a focusing lens, according to an embodiment of the inventive concept.

FIG. 20 is a view illustrating that a device 50 for analyzing the sample includes a focusing lens 580, according to an embodiment of the inventive concept.

Referring to FIG. 20, according to an embodiment of the inventive concept, the device 50 for analyzing the sample further includes the focusing lens 580 to focus light, which is irradiate from the light source 220, on the sample 2100 or the sensor unit 230.

In this case, the focusing lens 580 is provided under the light source 220.

Since the optical axis of the light source 220 is perpendicular to the surface of the sensor unit 230 such that the optical axis is directed toward the center of the sensor unit 230, the resolution power for density may be degraded to disperse light as the optical axis is farther away from the center of the sensor unit 230.

In addition, the above problem may cause an error when sensing data on the cell.

Accordingly, the above problem may be prevented by moving a focal point through the focusing lens 580 and by sensing surrounding data of the focal point at which the light is focused.

In more detail, the focusing lens 580 senses the surrounding data of the focal point while moving the focal point from one side of the sample 2100 to an opposite side of the sample 2100. The sensor unit 230, which senses the surrounding data of the focal point, consecutively senses the surrounding data, as the focal point is moved.

In addition, the focusing lens 580 moves coordinates X, Y, and Z of the focal point, and the control unit 240 generates a two-dimensional image or a three-dimensional image of the sample 2100 by reconstructing data sensed by the sensor unit 230, as the focal point is moved.

Accordingly, a user may analyze the sample 2100 by obtaining two-dimensional images or three-dimensional images of cells included in the sample 2100.

In addition, according to another embodiment of the inventive concept, the device 50 for analyzing a sample may include the color filter 470 and the focusing lens 580 together.

In this case, referring to FIG. 20, the light source 220 is movable in the horizontal direction, and the focusing lens 580 is movable in the vertical direction.

When the light source 220 moves in the horizontal direction, the incident angle and the incident distance of light passing through the medium of the sample 2100 are varied as the light source 220 moves in the horizontal direction. Accordingly, the visibility of the image may be increased.

In addition, when the light source 220 moves in the horizontal direction, since the refractive angle is varied depending on the change in position of the light source 220, materials of components, which are overlapped each other in the sample 2100, may be easily analyzed due to the change in the sensing position. Therefore, the sample 2100 may be three-dimensionally observed.

When the focusing lens 580 moves in the vertical direction, the image of the sample 2100 may be three-dimensionally implemented.

In some embodiments, the focusing lens 580 may be a liquid lens having a variable curvature. In this case, even if the position of the focusing lens 580 is fixed, the position of the focus may be arbitrarily changed by changing the curvature. Accordingly, the compactness of a product may be more advantageous when using the variable curvature, as compared to when adjusting the height.

Accordingly, according to the inventive concept, in the device 50 for analyzing the sample, the sample may be three-dimensionally analyzed through an optical density difference resulting from a difference between the media, and by changing the position of the light source 220.

Hereinafter, a method for measuring and analyzing a sample using the device for analyzing the sample will be described with reference to FIGS. 21 to 30, according to an embodiment of the inventive concept. In this case, the method for measuring and analyzing the sample by using the device for analyzing the sample may be performed by the control unit 240 or may be controlled to be performed by the control unit 240.

Figure 21:
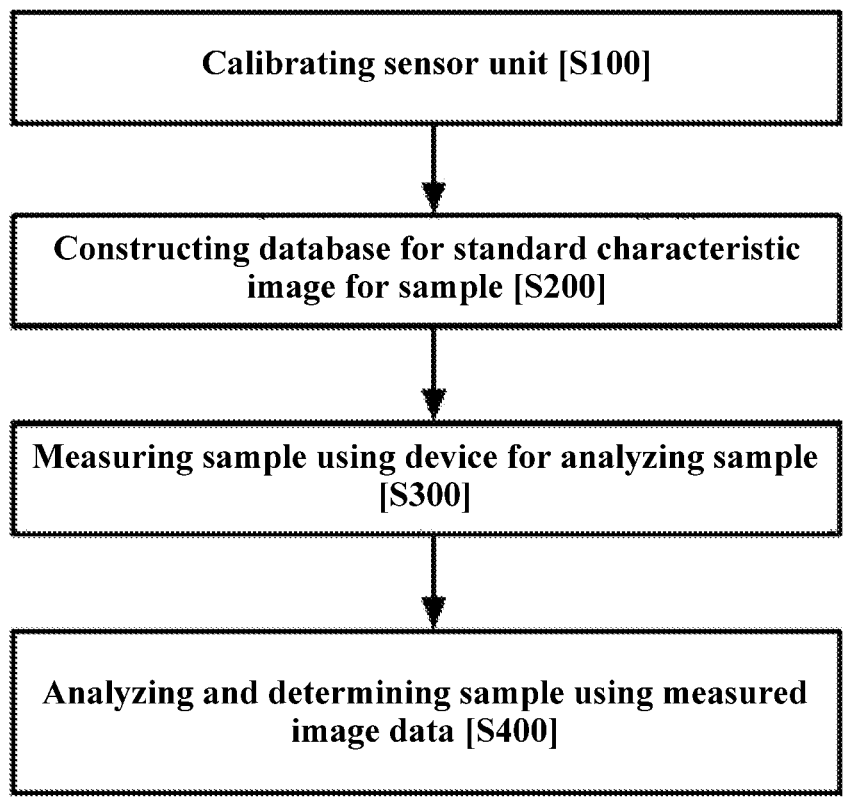
FIG. 21 is a flowchart illustrating a method for measuring and analyzing a sample using a device for analyzing a sample, according to an embodiment of the inventive concept.

Referring to FIG. 21, according to an embodiment of the inventive concept, the method for measuring and analyzing the sample by using the device for analyzing the sample includes calibrating the sensor unit 230 of the device 20 for analyzing the sample (S100), constructing a standard characteristic image database for a sample (S200), measuring the sample using the device 20 for analyzing the sample (S300), and analyzing and determining a sample using the measured image data (S400). However, according to some embodiments, the method for measuring and analyzing the sample using the device for analyzing the sample may include steps fewer than and more than the steps illustrated in FIG. 21.

In detail, referring to FIG. 21, the sensor unit 230 of the device 20 for analyzing the sample is calibrated (S100).

The direct contact manner requires the precise sensing of a transmission characteristic, such as the wavelength or the incident angle, of light passing through the sample 2100 and a fine characteristic difference depending on the type/component of a medium, through which light passes, constituting the sample 2100, since the sample 2100 is measure while directly making contact with the surface of the sensor unit 230. Accordingly, since a calibrating process of pixels constituting the sensor unit 230 under a standard parallel light source 2120 is provided, the device 20 for analyzing the sample may exactly measure and analyze the sample.

Figure 22:
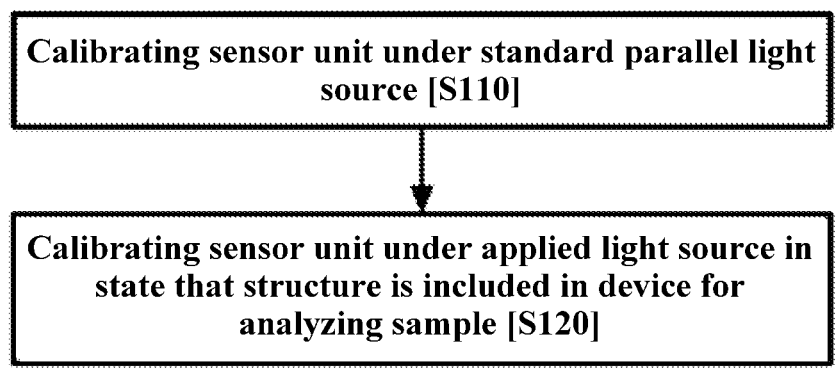
FIG. 22 is a detailed flowchart of step S100 of FIG. 21.
Figure 23:
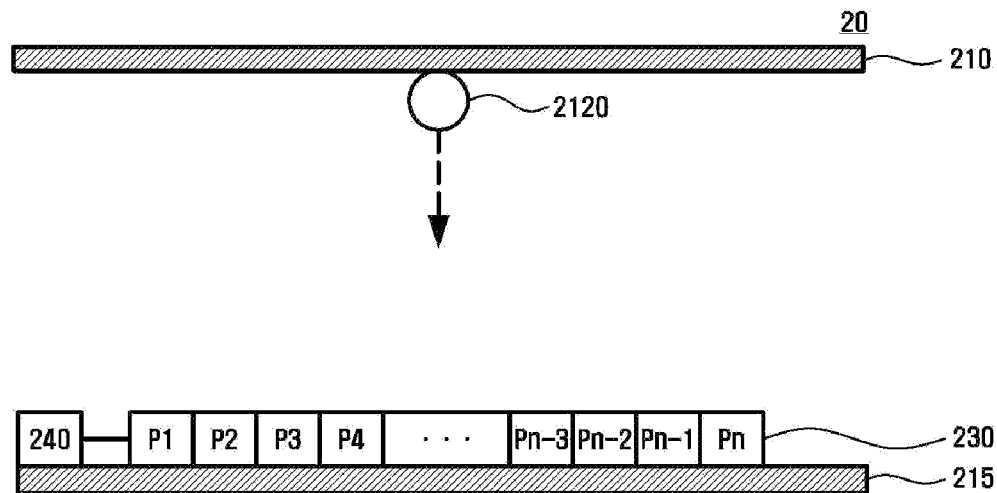
FIG. 23 is a view illustrating measurement in step S110 of FIG. 22.
Figure 24:
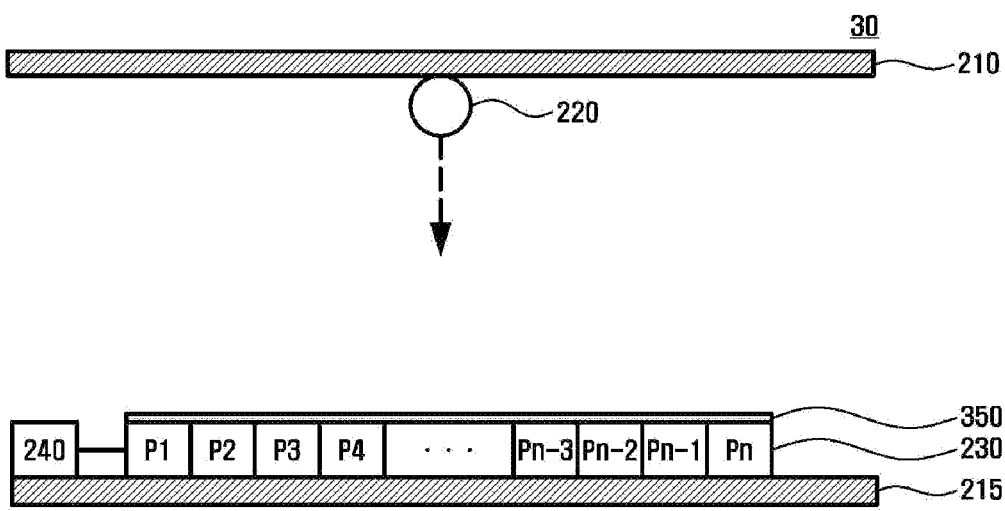
FIG. 24 is a view illustrating measurement in step S120 of FIG. 22.

To calibrate the sensor unit 230 of the device 20 for analyzing the sample (S100), the sensor unit 230 may be calibrated based on the measurement result under the standard parallel light source 2120 (S110) as illustrated in FIGS. 22 and 23, and may be calibrated based on the measurement result in the state that a structure is included in the device 20 for analyzing the sample under the applied light source 220 as illustrated in FIGS. 22 and 24. Meanwhile, the measurement is performed using the sensor unit 230 such that the calibration is performed in the state that the sample 2100 is not positioned on the sensor unit 230.

In this case, the standard parallel light source 2120 is a preset light source, and a selected wavelength may be applied if necessary. The applied light source 220 is a light source actually used for measuring the sample 2100, as the light source 220 is applied for the device 20 for analyzing the sample. In addition, the structure may be positioned on the sensor unit 230 in the measuring process to exert an influence on the measurement, and may include the sample holder 350, the color filter 470, or the cartridge.

Hereinafter, the calibration in the standard parallel light source 2120 will be described.

Figure 25:
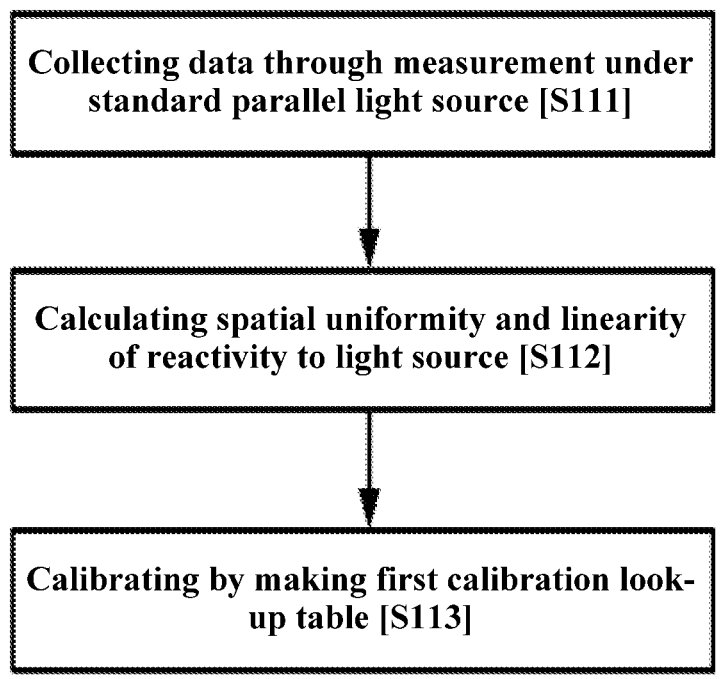
FIG. 25 is a detailed flowchart of step S110 of FIG. 22.

Referring to FIG. 25, to calibrate the sensor unit 230 based on the measurement result under the standard parallel light source 2120 (S110), the intensity of the standard parallel light source 2120 is measured N times (wherein N is a natural number) while being increased from zero to a value in a preset saturation range, such that the data on the intensity is collected (S111).

Figure 26A:
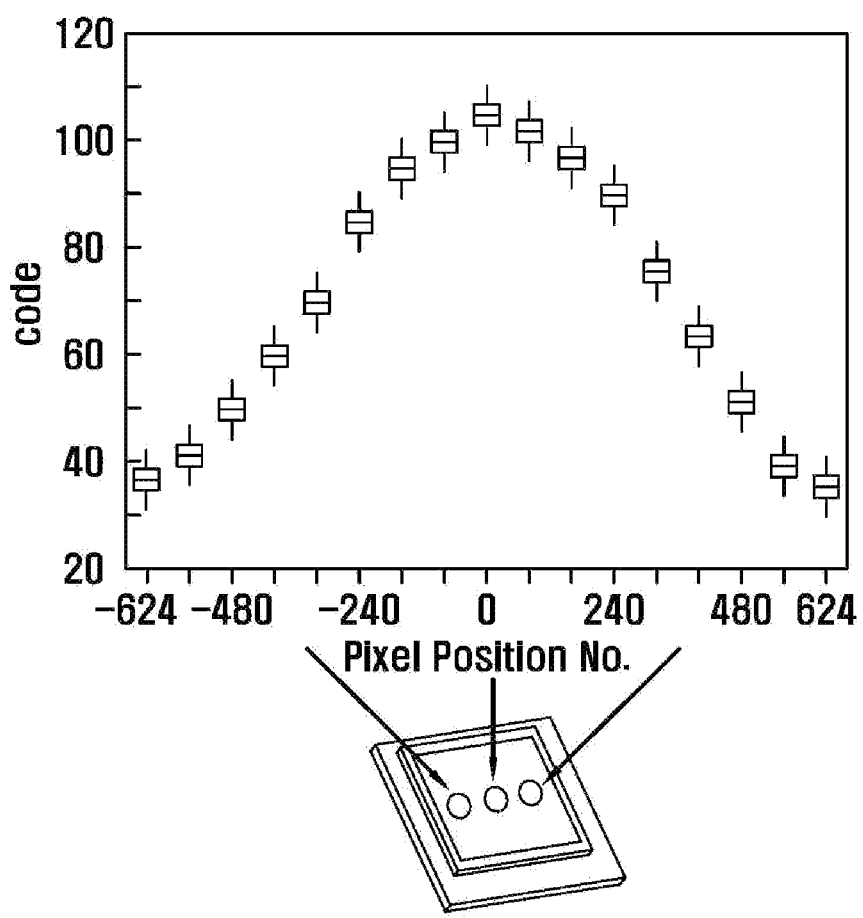
FIG. 26A is a view illustrating spatial uniformity of photoresponsivity for each pixel.
Figure 26B:
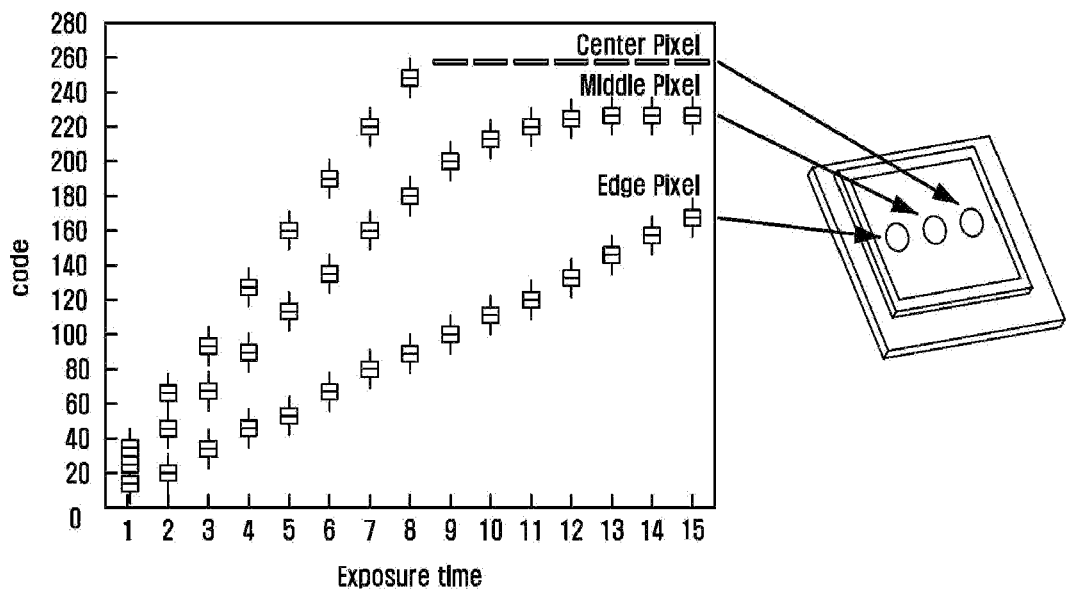
FIG. 26B is a view illustrating spatial linearity of photoresponsivity for each pixel.

Thereafter, referring to FIGS. 25, 26A, and 26B, the spatial uniformity and linearity of photoresponsivity for each pixel P are calculated based on a representative value in a statistical box plot of N-times measured values for each pixel P of the sensor unit 230 (S112).

Figure 26C:
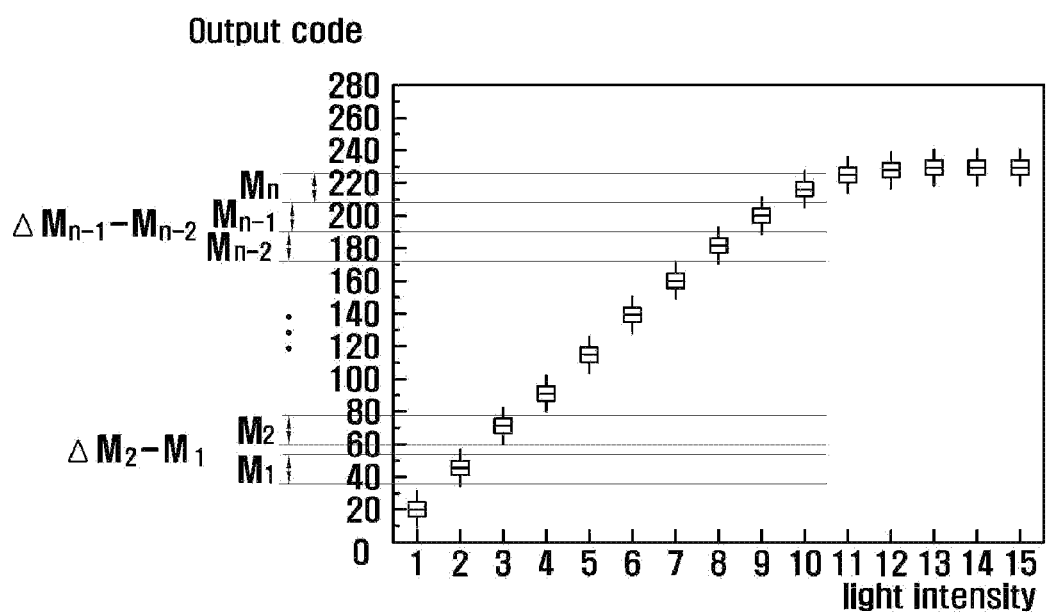
FIG. 26C is a view illustrating calibration of special linearity of photoresponsivity for each pixel.

Thereafter, referring to FIGS. 25 and 26C, the spatial uniformity and linearity of the photoresponsivity is calibrated by making a first calibration look-up table of each pixel P corresponding to the standard parallel light source 2120 (S113).

Hereinafter, the calibration of the applied light source 220 will be described. In this case, although the wavelength of the standard parallel light source 2120 is identical to the wavelength of the applied light source 220, the inventive concept is not limited thereto.

Figure 27:
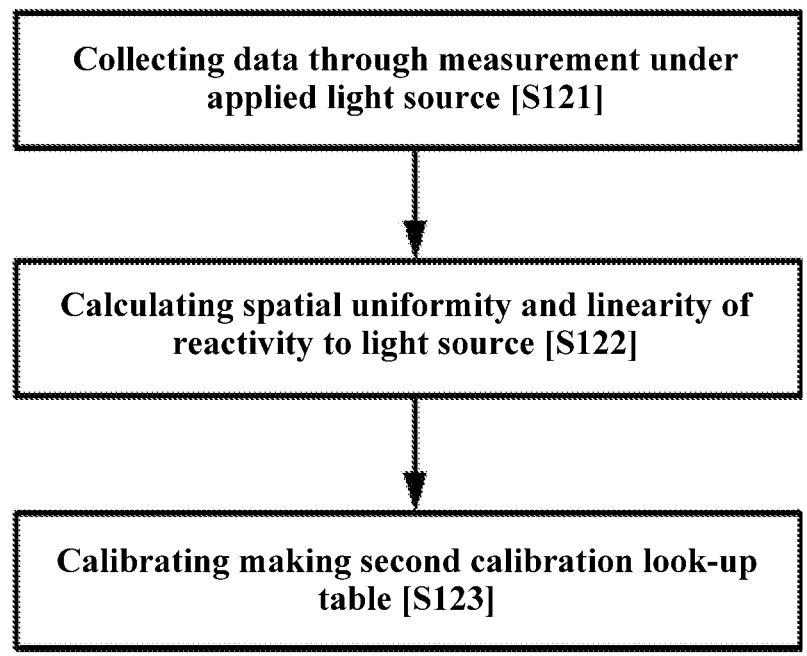
FIG. 27 is a detailed flowchart of step S120 of FIG. 22.

Referring to FIG. 27, to calibrate the sensor unit 230 based on the measurement result under the applied light source 220, in the state that the structure is included in the device 20 for analyzing the sample (S120), the intensity of the applied light source 220 is measured N times while being increased from zero to a value in a saturation range, such that data on the intensity of the applied light source 220 is collected (S121).

Thereafter, referring to FIGS. 26A, 26B, and 27, the spatial uniformity and linearity of photoresponsivity for each pixel P are calculated based on a representative value in a statistical box plot of N-times measured values for each pixel P of the sensor unit 230 (S122).

Thereafter, referring to FIGS. 26C and 27, the spatial uniformity and linearity of the photoresponsivity are calibrated (S123) by making a second calibration look-up table of each pixel P corresponding to the applied light source 220 (S123).

Figure 28:
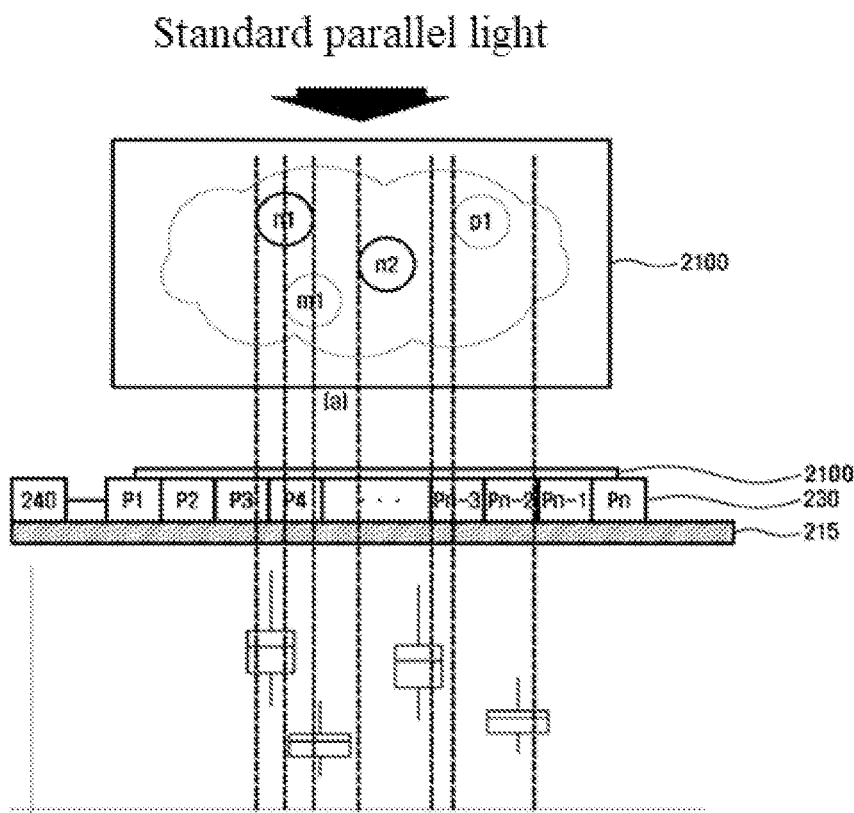
FIG. 28 is a view illustrating measurement in step S120 of FIG. 22.
Figure 29:
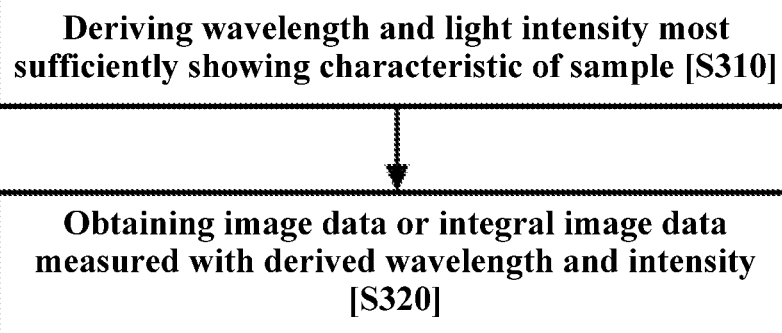
FIG. 29 is a detailed flowchart of step S300 of FIG. 21.
Figure 30:
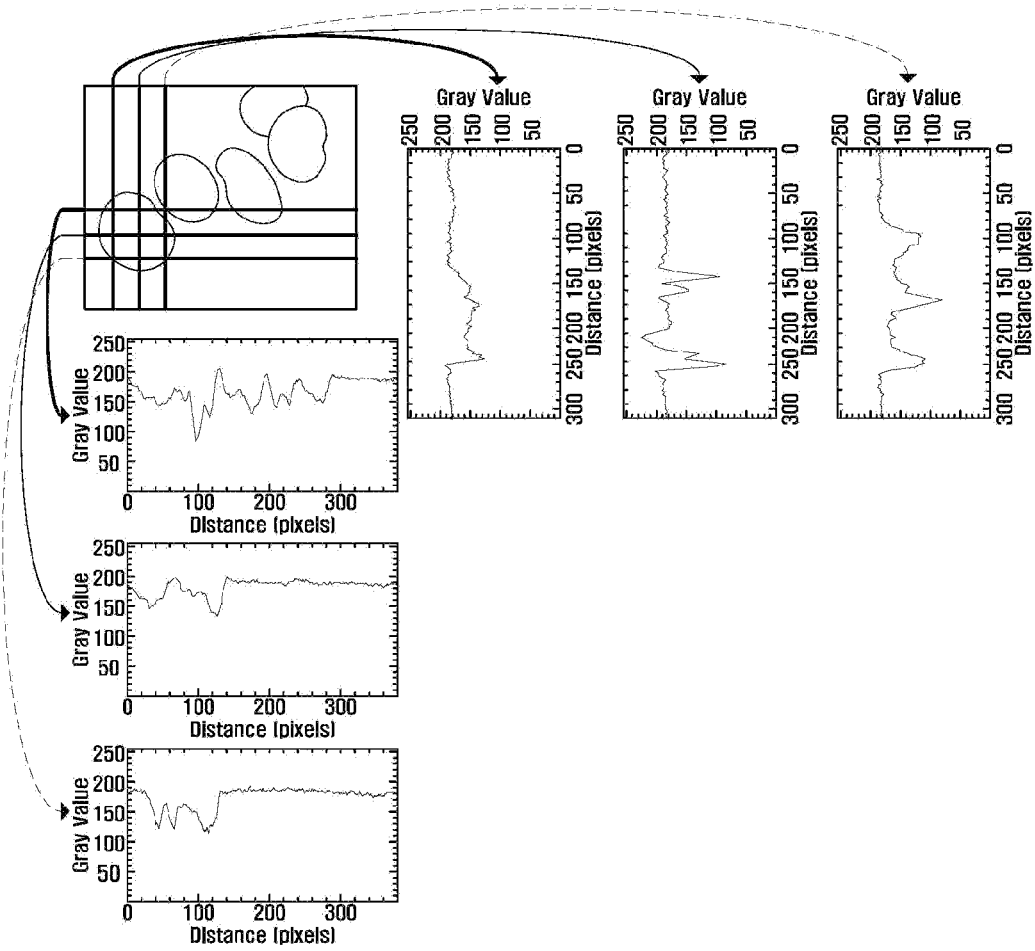
FIG. 30 is a view illustrating step S300 of FIG. 21.

Thereafter, referring to FIGS. 21 and 28, a database for a standard characteristic image of the sample 2100 is constructed (S200).

In the present step, the database is constructed with respect to the standard characteristic image of the sample 2100 for each of various wavelengths by using the standard parallel light source 2120. To construct the database for the standard characteristic image in detail, wavelengths may be used in various sizes with various intensities.

For example, the first calibration look-up table and the second calibration look-up table are made, and the database for the standard characteristic image of the sample 2100 is constructed by repeating the process of placing the sample 2100, such as a cancer cell, a red blood cell, or a white blood cell, to be measured on the sensor unit 230, measuring the intensity of the standard parallel light source 2120 N times (wherein N is a natural number) while being increased from zero to a value in a preset saturation range such that the data on the intensity is collected, calculating the spatial uniformity and linearity of the photoresponsivity for each pixel P, based on a representative value in a statistical box plot of N-times measured values for each pixel P of the sensor unit 230, and calibrating the spatial uniformity and linearity of the photoresponsivity for each pixel P by making the first calibration look-up table of each pixel P corresponding to the standard parallel light source 2120.

Thereafter, referring to FIG. 21, the sample is measured by using the device 20 for analyzing the sample (S300).

To this end, referring to FIGS. 16A to 16C and FIG. 29, the wavelength and light intensity most sufficiently showing the characteristic of the sample 2100 to be measured are derived from the database of the standard characteristic image (S310). In this case, when the sample 2100 includes several components, an appropriate wavelength and an appropriate light intensity may be derived with respect to each component of each sample 2100, and the wavelength and light intensity most sufficiently showing the characteristic of the sample 2100 may be the wavelength and the intensity when the matching/likely-hood probability shows the greatest value. For example, a matching method of an image pattern used to calculate the matching/likelihood probability may include Harris corner detector which is well known, a method of extracting a Shi-Tomasi feature point, Scale Invariant Feature Transform (SIFT), Features from Accelerated Segment Test (FAST), an AGAST manner, and a local invariant feature descriptor such as SIFT, SURF, BRIEF, ORB, or FREAK, or a deep-learning technology, but the inventive concept is not limited thereto.

Thereafter, referring to FIGS. 16A to 16C, and FIGS. 29 and 30, the sample 2100 is placed on the sensor unit 230, and image data and integral image data are obtained through the measurement using the wavelength (for example, the first wavelength, the second wavelength, and the third wavelength) and the light intensity most sufficiently showing the characteristic of the sample 2100 (S320). The integral image data sufficiently showing the whole sample 2100 may be obtained based on image data obtained through measurement using various wavelengths and the light intensity.

Finally, referring to FIG. 21, the sample is analyzed and determined using the measured image data (S400).

The image data of the sample 2100, which is obtained through the measurement, is compared (for example, a filtering operation of a standard characteristic image of the relevant sample 2100) with the database for the standard specific image of the sample 2100, and matched image data is found. The probability for exact matching is employed, and expressed in the form x %. In addition, the type of a relevant target sample and the number of relevant target samples may be measured and displayed.

As described above, according to the inventive concept, the large-area sample may be simultaneously analyzed.

In addition, according to the inventive concept, the device for analyzing the sample may be provided to verify the components of the sample without using the optical lens, and without dyeing the sample, thereby exactly and rapidly analyzing the sample.

In addition, according to the inventive concept, the plurality of image data are obtained and reconstructed using the difference in light characteristic between media for each wavelength, thereby analyzing the components of the sample.

In addition, according to the inventive concept, the light incident angle is changed by horizontally moving the light source, thereby effectively analyzing the components of the sample.

In addition, according to the inventive concept, since the sample is analyzed by adjusting the focal point through the focusing lens, the error may be minimized and the sample may be exactly analyzed.

In addition, according to the inventive concept, the fine difference in characteristic between samples may be recognized through the calibration.

The effects of the inventive concept are not limited to the above, but other effects, which are not mentioned, will be apparently understood to those skilled in the art.

Although the embodiment of the inventive concept have been described with reference to accompanying drawings, those skilled in the art should understand that various modifications are possible without departing from the technical scope of the inventive concept or without changing the technical sprite or the subject matter of the inventive concept. Therefore, those skilled in the art should understand that the technical embodiments are provided for the illustrative purpose in all aspects and the inventive concept is not limited thereto.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for measuring and analyzing a sample using a device for analyzing a sample in direct contact manner, the method comprising:

calibrating a sensor unit of the device, wherein the device comprises: a light source configured to irradiate light having mutually different wavelengths to the sample with a time difference; the sensor unit configured to sense data on the sample, as the light source irradiates light for each wavelength, wherein the sample is positioned to be adjacent to the sensor unit; and a control unit configured to obtain image data on components included in the sample by using sensing data of the sensor unit for each wavelength, as the light source irradiates light with respect to the wavelength;

constructing a database for a standard characteristic image of the sample;

measuring the sample using the device; and analyzing and determining the sample using image data of the measured sample.

2. The method of claim 1, wherein the light source comprises a first light source configured to emit first light having a preset wavelength, or a second light source configured to emit second light for measuring the sample, and wherein the calibrating the sensor unit comprises:

calibrating the sensor unit based on a result measured in a state that the first light source is included in the device; and calibrating the sensor unit based on a result measured b in a state that the second light source is included in the device.

3. The method of claim 2, wherein the device further comprises: at least one of a sample holder, a color filter or a cartridge.

4. The method of claim 2, wherein the calibrating the sensor unit based on the result measured in the state that the first light source is included in the device comprises:

collecting data by measuring each N times (where N is a natural number) while increasing an intensity of the first light source to a predetermined saturation range;

calculating spatial uniformity and linearity of photoresponsivity for each pixel based on a representative value of a statistical box plot of N-times measured values for each pixel of the sensor unit; and calibrating the spatial uniformity and linearity of the photoresponsivity by creating a look-up table of a first calibration of each pixel corresponding to the first light source.

5. The method of claim 1, wherein the measuring comprises:

deriving a wavelength and intensity of the light source most sufficiently showing a characteristic of the sample to be measured from the database; and obtaining each image data measured based on the derived wavelength and the intensity of the light source.

6. The method of claim 1, wherein the sensor unit includes a plurality of pixels, and wherein each pixel receives light passing through a partial area of the sample, which overlaps the pixel and makes contact with a top surface of the sensor unit, and generates the sensing data for each wavelength by using received data.

* * * * *